United States Patent
James et al.

(10) Patent No.: US 12,287,790 B2
(45) Date of Patent: Apr. 29, 2025

(54) RUNTIME SYSTEMS QUERY COORDINATOR

(71) Applicant: Splunk Inc., San Francisco, CA (US)

(72) Inventors: Alexander Douglas James, Sammamish, WA (US); Vinayak Bhakta, San Jose, CA (US); Ganesh Jothikumar, Los Altos, CA (US); Bei Li, Redwood City, CA (US); Jengie Shau, Saratoga, CA (US)

( * ) Notice: Subject to any disclaimer, the term of this patent is extended or adjusted under 35 U.S.C. 154(b) by 0 days.

(21) Appl. No.: 18/309,596

(22) Filed: Apr. 28, 2023

(65) Prior Publication Data
US 2024/0256545 A1    Aug. 1, 2024

Related U.S. Application Data

(60) Provisional application No. 63/482,530, filed on Jan. 31, 2023.

(51) Int. Cl.
| | |
|---|---|
| G06F 16/2453 | (2019.01) |
| G06F 16/22 | (2019.01) |
| G06F 16/23 | (2019.01) |
| G06F 16/242 | (2019.01) |

(52) U.S. Cl.
CPC .... *G06F 16/24549* (2019.01); *G06F 16/2228* (2019.01); *G06F 16/2358* (2019.01); *G06F 16/2433* (2019.01); *G06F 16/24542* (2019.01)

(58) Field of Classification Search
CPC ......... G06F 16/24549; G06F 16/24542; G06F 16/2433; G06F 16/2228; G06F 16/2358
USPC ...................................................... 707/718
See application file for complete search history.

(56) References Cited

U.S. PATENT DOCUMENTS

| | | | |
|---|---|---|---|
| 5,187,750 | A | 2/1993 | Behera |
| 5,590,321 | A | 12/1996 | Lin et al. |
| 5,623,652 | A | 4/1997 | Vora et al. |
| 5,812,793 | A | 9/1998 | Shakib et al. |
| 5,913,214 | A | 6/1999 | Madnick et al. |

(Continued)

FOREIGN PATENT DOCUMENTS

| | | |
|---|---|---|
| CN | 103729447 A | 4/2014 |
| CN | 105893205 A | 8/2016 |

(Continued)

OTHER PUBLICATIONS

Splunk Enterprise 8.0.0 Overview, available online, retrieved May 20, 2020 from docs.splunk.com.

(Continued)

*Primary Examiner* — Joshua Bullock
(74) *Attorney, Agent, or Firm* — Shook, Hardy & Bacon L.L.P.

(57) ABSTRACT

Systems and methods are disclosed for receiving, at query coordinator, a search query. The query coordinator parses the search query and generates tasks for different runtime systems. The query coordinator configures an interface enabling inter system communication between the runtime systems. The generated tasks are distributed to the runtime systems and partial results of a runtime system are communicated to the interface. The query coordinator retrieves the partial results from the interface, finalizes the partial results, and sends finalized results them to the requestor of the search query.

20 Claims, 7 Drawing Sheets

(56) References Cited

U.S. PATENT DOCUMENTS

| | | | |
|---|---|---|---|
| 5,918,049 | A | 6/1999 | Syväniemi |
| 5,941,969 | A | 8/1999 | Ram et al. |
| 6,009,422 | A | 12/1999 | Ciccarelli |
| 6,081,883 | A | 6/2000 | Popelka et al. |
| 6,154,781 | A | 11/2000 | Bolam et al. |
| 6,185,666 | B1 | 2/2001 | Murray et al. |
| 6,205,441 | B1 | 3/2001 | Al-Omari et al. |
| 6,282,537 | B1 | 8/2001 | Madnick et al. |
| 6,408,294 | B1 | 6/2002 | Getchius et al. |
| 6,430,553 | B1 | 8/2002 | Ferret |
| 6,463,454 | B1 | 10/2002 | Lumelsky et al. |
| 6,466,980 | B1 | 10/2002 | Lumelsky et al. |
| 6,490,585 | B1 | 12/2002 | Hanson et al. |
| 6,502,091 | B1 | 12/2002 | Chundi et al. |
| 6,505,191 | B1 | 1/2003 | Baclawski |
| 6,578,131 | B1 | 6/2003 | Larson et al. |
| 6,741,982 | B2 | 5/2004 | Soderstrom et al. |
| 6,786,418 | B1 | 9/2004 | Francois |
| 6,920,396 | B1 | 7/2005 | Wallace et al. |
| 7,007,275 | B1 | 2/2006 | Hanson et al. |
| 7,039,764 | B1 | 5/2006 | Shetty et al. |
| 7,233,939 | B1 | 6/2007 | Ziauddin |
| 7,249,192 | B1 | 7/2007 | Brewer et al. |
| 7,290,196 | B1 | 10/2007 | Annayya et al. |
| 7,370,068 | B1 | 5/2008 | Pham et al. |
| 7,505,985 | B2 | 3/2009 | Kilroy |
| 7,536,686 | B2 | 5/2009 | Tan et al. |
| 7,634,511 | B1 | 12/2009 | Freiheit et al. |
| 7,685,109 | B1 | 3/2010 | Ransil et al. |
| 7,685,281 | B1 | 3/2010 | Saraiya et al. |
| 7,689,553 | B2 | 3/2010 | Zuzarte |
| 7,689,633 | B1 | 3/2010 | Li et al. |
| 7,698,267 | B2 | 4/2010 | Papakonstantinou et al. |
| 7,702,610 | B2 | 4/2010 | Zane et al. |
| 7,769,722 | B1 | 8/2010 | Bergant et al. |
| 7,895,359 | B2 | 2/2011 | Reed et al. |
| 7,937,344 | B2 | 5/2011 | Baum et al. |
| 7,962,464 | B1 | 6/2011 | Brette et al. |
| 8,019,725 | B1 | 9/2011 | Mulligan et al. |
| 8,112,425 | B2 | 2/2012 | Baum et al. |
| 8,190,593 | B1 | 5/2012 | Dean |
| 8,195,922 | B2 | 6/2012 | Chen et al. |
| 8,412,696 | B2 | 4/2013 | Zhang et al. |
| 8,473,316 | B1 | 6/2013 | Panzitta et al. |
| 8,504,620 | B2 | 8/2013 | Chi et al. |
| 8,527,645 | B1 | 9/2013 | Proffit et al. |
| 8,589,375 | B2 | 11/2013 | Zhang et al. |
| 8,589,403 | B2 | 11/2013 | Marquardt et al. |
| 8,589,432 | B2 | 11/2013 | Zhang et al. |
| 8,601,112 | B1 | 12/2013 | Nordstrom et al. |
| 8,682,925 | B1 | 3/2014 | Marquardt et al. |
| 8,719,520 | B1 | 5/2014 | Piszczek et al. |
| 8,738,587 | B1 | 5/2014 | Bitincka et al. |
| 8,738,629 | B1 | 5/2014 | Bitincka et al. |
| 8,751,529 | B2 | 6/2014 | Zhang et al. |
| 8,761,077 | B2 | 6/2014 | Kim et al. |
| 8,762,367 | B2 | 6/2014 | Burger et al. |
| 8,769,493 | B2 | 7/2014 | Arnold et al. |
| 8,788,525 | B2 | 7/2014 | Neels et al. |
| 8,788,526 | B2 | 7/2014 | Neels et al. |
| 8,793,225 | B1 | 7/2014 | Bitincka et al. |
| 8,806,361 | B1 | 8/2014 | Noel et al. |
| 8,838,678 | B1 | 9/2014 | Weiss |
| 8,849,891 | B1 | 9/2014 | Suchter et al. |
| 8,874,755 | B1 | 10/2014 | Deklich et al. |
| 8,874,961 | B2 | 10/2014 | Pillai et al. |
| 8,924,476 | B1 | 12/2014 | Granström et al. |
| 8,935,257 | B1 | 1/2015 | Vermuri et al. |
| 8,935,302 | B2 | 1/2015 | Flynn et al. |
| 8,943,569 | B1 | 1/2015 | Luckett, Jr. et al. |
| 8,959,221 | B2 | 2/2015 | Morgan |
| 8,983,912 | B1 | 3/2015 | Beedgen et al. |
| 8,983,994 | B2 | 3/2015 | Neels et al. |
| 8,990,148 | B1 | 3/2015 | Ziegler et al. |
| 9,015,197 | B2 | 4/2015 | Richards et al. |
| 9,026,903 | B1 | 5/2015 | Michael et al. |
| 9,087,030 | B2 | 7/2015 | Basile |
| 9,087,090 | B1 | 7/2015 | Cormier et al. |
| 9,124,612 | B2 | 9/2015 | Vasan et al. |
| 9,128,636 | B2 | 9/2015 | Arakawa |
| 9,128,980 | B2 | 9/2015 | Neels et al. |
| 9,128,985 | B2 | 9/2015 | Marquartd |
| 9,130,971 | B2 | 9/2015 | Vasan et al. |
| 9,135,560 | B1 | 9/2015 | Saurabh et al. |
| 9,141,665 | B1* | 9/2015 | Munro ............... G06F 16/2453 |
| 9,173,801 | B2 | 11/2015 | Merza |
| 9,185,007 | B2 | 11/2015 | Fletcher et al. |
| 9,215,240 | B2 | 12/2015 | Merza et al. |
| 9,244,999 | B2 | 1/2016 | Jin et al. |
| 9,248,068 | B2 | 2/2016 | Merza |
| 9,256,467 | B1 | 2/2016 | Singh et al. |
| 9,262,519 | B1 | 2/2016 | Saurabh |
| 9,286,413 | B1 | 3/2016 | Coates et al. |
| 9,292,620 | B1 | 3/2016 | Hoover et al. |
| 9,336,327 | B2 | 5/2016 | Melnik et al. |
| 9,342,571 | B1 | 5/2016 | Kurtic et al. |
| 9,378,088 | B1 | 6/2016 | Piszczek et al. |
| 9,426,045 | B2 | 8/2016 | Fletcher et al. |
| 9,426,172 | B2 | 8/2016 | Merza |
| 9,432,396 | B2 | 8/2016 | Merza |
| 9,438,470 | B2 | 9/2016 | Brady, Jr. et al. |
| 9,438,515 | B2 | 9/2016 | McCormick et al. |
| 9,489,385 | B1 | 11/2016 | Ladola |
| 9,495,427 | B2 | 11/2016 | Adabi et al. |
| 9,514,146 | B1 | 12/2016 | Wallace et al. |
| 9,514,189 | B2 | 12/2016 | Bitincka et al. |
| 9,558,194 | B1 | 1/2017 | Srivastav et al. |
| 9,589,012 | B2 | 3/2017 | Neels et al. |
| 9,619,581 | B2 | 4/2017 | Hughes et al. |
| 9,621,636 | B1 | 4/2017 | McVeety et al. |
| 9,672,116 | B1 | 6/2017 | Chopra et al. |
| 9,672,274 | B1 | 6/2017 | Goo |
| 9,722,951 | B2 | 8/2017 | Almadi |
| 9,734,180 | B1 | 8/2017 | Graham et al. |
| 9,753,935 | B1 | 9/2017 | Tobin et al. |
| 9,779,015 | B1 | 10/2017 | Oikarinen et al. |
| 9,806,978 | B2 | 10/2017 | McAlister et al. |
| 9,838,292 | B2 | 12/2017 | Polychronis |
| 9,900,397 | B1 | 2/2018 | Cope et al. |
| 9,959,062 | B1 | 5/2018 | Piszczek et al. |
| 9,984,128 | B2 | 5/2018 | Vasan et al. |
| 9,990,386 | B2 | 6/2018 | Marquardt et al. |
| 9,992,741 | B2 | 6/2018 | Trainin et al. |
| 9,996,400 | B2 | 6/2018 | Nakagawa et al. |
| 10,025,795 | B2 | 7/2018 | Fokoue-Nkoutche et al. |
| 10,031,922 | B2 | 7/2018 | Fokoue-Nkoutche et al. |
| 10,037,341 | B1 | 7/2018 | Bassov et al. |
| 10,049,160 | B2 | 8/2018 | Bitincka et al. |
| 10,091,100 | B1 | 10/2018 | Duerk |
| 10,095,993 | B1 | 10/2018 | Bar-Menachem et al. |
| 10,120,898 | B1 | 11/2018 | Betawadkar-Norwood et al. |
| 10,127,258 | B2 | 11/2018 | Lamas et al. |
| 10,142,204 | B2 | 11/2018 | Nickolov et al. |
| 10,169,465 | B2* | 1/2019 | Andrews ............. G06F 16/9535 |
| 10,216,774 | B2 | 2/2019 | Dang et al. |
| 10,318,491 | B1 | 6/2019 | Graham et al. |
| 10,318,511 | B2 | 6/2019 | De Smet et al. |
| 10,320,638 | B1 | 6/2019 | Lauinger et al. |
| 10,353,965 | B2 | 7/2019 | Pal et al. |
| 10,437,653 | B2 | 10/2019 | Cyr et al. |
| 10,445,311 | B1 | 10/2019 | Saurabh et al. |
| 10,452,632 | B1 | 10/2019 | Simmen et al. |
| 10,474,723 | B2 | 11/2019 | Hodge et al. |
| 10,528,599 | B1 | 1/2020 | Pandis et al. |
| 10,534,794 | B2 | 1/2020 | Dageville et al. |
| 10,558,656 | B2 | 2/2020 | Wells et al. |
| 10,585,951 | B2 | 3/2020 | Bhattacharjee et al. |
| 10,592,561 | B2 | 3/2020 | Bhattacharjee et al. |
| 10,592,562 | B2 | 3/2020 | Pal et al. |
| 10,592,563 | B2 | 3/2020 | Pal et al. |
| 10,599,662 | B2 | 3/2020 | Constantino et al. |
| 10,599,723 | B2 | 3/2020 | Bhattacharjee et al. |
| 10,599,724 | B2 | 3/2020 | Pal et al. |
| 10,606,856 | B2 | 3/2020 | Bath et al. |

(56) References Cited

U.S. PATENT DOCUMENTS

| | | |
|---|---|---|
| 10,614,132 B2 | 4/2020 | Bingham et al. |
| 10,657,061 B1 | 5/2020 | Marriner |
| 10,657,146 B2 | 5/2020 | Bath et al. |
| 10,691,523 B2 | 6/2020 | Noel et al. |
| 10,706,056 B1 | 7/2020 | Lin et al. |
| 10,726,009 B2 | 7/2020 | Pal et al. |
| 10,769,148 B1 | 9/2020 | Binkert et al. |
| 10,776,355 B1 | 9/2020 | Batsakis et al. |
| 10,776,374 B2 | 9/2020 | Valine et al. |
| 10,795,884 B2 | 10/2020 | Bhattacharjee et al. |
| 10,896,182 B2 | 1/2021 | Bhattacharjee et al. |
| 10,936,585 B1 | 3/2021 | Echeverria et al. |
| 10,956,415 B2 | 3/2021 | Pal et al. |
| 10,977,260 B2 | 4/2021 | Pal et al. |
| 10,984,044 B1 | 4/2021 | Batsakis et al. |
| 10,999,164 B1 | 5/2021 | Sridhar et al. |
| 11,003,714 B1 | 5/2021 | Batsakis et al. |
| 11,010,435 B2 | 5/2021 | Pal et al. |
| 11,023,463 B2 | 6/2021 | Pal et al. |
| 11,023,539 B2 | 6/2021 | Pal et al. |
| 11,080,345 B2 | 8/2021 | Pal et al. |
| 11,100,106 B1 | 8/2021 | Sainanee et al. |
| 11,106,734 B1 | 8/2021 | Batsakis et al. |
| 11,113,353 B1 | 9/2021 | Echeverria et al. |
| 11,126,632 B2 | 9/2021 | Pal et al. |
| 11,151,137 B2 | 10/2021 | Bhattacharjee et al. |
| 11,163,758 B2 | 11/2021 | James et al. |
| 11,176,208 B2 | 11/2021 | Pal et al. |
| 11,194,552 B1 | 12/2021 | Echeverria et al. |
| 11,222,066 B1 | 1/2022 | Batsakis et al. |
| 11,232,100 B2 | 1/2022 | Bhattacharjee et al. |
| 11,238,112 B2 | 2/2022 | Hodge et al. |
| 11,243,963 B2 | 2/2022 | Pal et al. |
| 11,250,056 B1 | 2/2022 | Batsakis et al. |
| 11,269,939 B1 | 3/2022 | Sammer et al. |
| 11,281,706 B2 | 3/2022 | Pal et al. |
| 11,294,941 B1 | 4/2022 | Sammer et al. |
| 11,314,753 B2 | 4/2022 | Pal et al. |
| 11,321,321 B2 | 5/2022 | Bhattacharjee et al. |
| 11,334,543 B1 | 5/2022 | Anwar et al. |
| 11,341,131 B2 | 5/2022 | Pal et al. |
| 11,392,654 B2 | 7/2022 | Pal et al. |
| 11,416,528 B2 | 8/2022 | Pal et al. |
| 11,442,935 B2 | 9/2022 | Pal et al. |
| 11,461,334 B2 | 10/2022 | Bhattacharjee et al. |
| 11,494,380 B2 | 11/2022 | Rao et al. |
| 11,500,875 B2 | 11/2022 | Bhattacharjee et al. |
| 11,537,311 B1 | 12/2022 | Dhupelia et al. |
| 11,550,847 B1 | 1/2023 | Batsakis et al. |
| 11,562,023 B1 | 1/2023 | Batsakis et al. |
| 11,567,993 B1 | 1/2023 | Batsakis et al. |
| 11,580,107 B2 | 2/2023 | Pal et al. |
| 11,586,627 B2 | 2/2023 | Bhattacharjee et al. |
| 11,586,692 B2 | 2/2023 | Bhattacharjee et al. |
| 11,593,377 B2 | 2/2023 | Bhattacharjee et al. |
| 11,599,541 B2 | 3/2023 | Pal et al. |
| 11,604,795 B2 | 3/2023 | Pal et al. |
| 11,615,087 B2 | 3/2023 | Pal et al. |
| 11,615,104 B2 | 3/2023 | Pal et al. |
| 11,620,336 B1 | 4/2023 | Batsakis et al. |
| 11,636,105 B2 | 4/2023 | Pal et al. |
| 11,663,227 B2 | 5/2023 | Pal et al. |
| 11,704,313 B1 | 7/2023 | Andrade et al. |
| 11,720,537 B2 | 8/2023 | Anwar et al. |
| 11,797,618 B2 | 10/2023 | Pal et al. |
| 11,860,874 B2 | 1/2024 | Bhattacharjee et al. |
| 11,860,940 B1 | 1/2024 | Batsakis et al. |
| 11,874,691 B1 | 1/2024 | Batsakis et al. |
| 11,921,672 B2 | 3/2024 | Pal et al. |
| 11,922,222 B1 | 3/2024 | Chawla et al. |
| 11,966,391 B2 | 4/2024 | Pal et al. |
| 11,989,194 B2 | 5/2024 | Bhattacharjee et al. |
| 11,995,079 B2 | 5/2024 | Pal et al. |
| 12,007,996 B2 | 6/2024 | Rao et al. |
| 12,013,895 B2 | 6/2024 | Batsakis et al. |
| 12,072,939 B1 | 8/2024 | Batsakis et al. |
| 2001/0016821 A1 | 8/2001 | DeBusk et al. |
| 2002/0070968 A1 | 6/2002 | Austin et al. |
| 2002/0112123 A1 | 8/2002 | Becker et al. |
| 2002/0138471 A1 | 9/2002 | Dutta et al. |
| 2002/0152299 A1 | 10/2002 | Traversat et al. |
| 2002/0198869 A1 | 12/2002 | Barnett |
| 2003/0014403 A1 | 1/2003 | Chandrasekar et al. |
| 2003/0066033 A1 | 4/2003 | Direen et al. |
| 2003/0106015 A1 | 6/2003 | Chu et al. |
| 2003/0120682 A1 | 6/2003 | Bestgen et al. |
| 2003/0120723 A1 | 6/2003 | Bright et al. |
| 2003/0130993 A1 | 7/2003 | Mendelevitch et al. |
| 2003/0154238 A1 | 8/2003 | Murphy et al. |
| 2003/0167270 A1 | 9/2003 | Werme et al. |
| 2003/0188198 A1 | 10/2003 | Holdsworth et al. |
| 2003/0229620 A1 | 12/2003 | Carlson et al. |
| 2004/0017395 A1 | 1/2004 | Cook |
| 2004/0122845 A1 | 5/2004 | Lohman et al. |
| 2004/0117345 A1 | 6/2004 | Bamford et al. |
| 2004/0143604 A1 | 7/2004 | Glenner et al. |
| 2004/0230571 A1 | 11/2004 | Robertson |
| 2005/0022047 A1 | 1/2005 | Chandrasekaran |
| 2005/0022207 A1 | 1/2005 | Grabarnik et al. |
| 2005/0027796 A1 | 2/2005 | San Andres et al. |
| 2005/0066027 A1 | 3/2005 | Hakiel et al. |
| 2005/0076067 A1 | 4/2005 | Bakalash et al. |
| 2005/0102325 A1 | 5/2005 | Gould et al. |
| 2005/0192937 A1 | 9/2005 | Barsness et al. |
| 2005/0289232 A1 | 12/2005 | Ebert |
| 2006/0026211 A1 | 2/2006 | Potteiger |
| 2006/0069717 A1 | 3/2006 | Mamou et al. |
| 2006/0074916 A1 | 4/2006 | Beary |
| 2006/0155720 A1 | 7/2006 | Feinberg |
| 2006/0161560 A1 | 7/2006 | Khandelwal et al. |
| 2006/0173993 A1 | 8/2006 | Henseler et al. |
| 2006/0184998 A1 | 8/2006 | Smith et al. |
| 2006/0212607 A1 | 9/2006 | Riethmuller |
| 2006/0224587 A1 | 10/2006 | Zamir et al. |
| 2006/0224603 A1 | 10/2006 | Correll |
| 2006/0248045 A1 | 11/2006 | Toledano et al. |
| 2006/0259460 A1 | 11/2006 | Zurek et al. |
| 2006/0271504 A1 | 11/2006 | Anderson et al. |
| 2007/0033155 A1 | 2/2007 | Landsman |
| 2007/0050328 A1 | 3/2007 | Li et al. |
| 2007/0100873 A1 | 5/2007 | Yako et al. |
| 2007/0136311 A1 | 6/2007 | Kasten et al. |
| 2007/0143261 A1 | 6/2007 | Uppala |
| 2007/0156842 A1 | 7/2007 | Vermeulen et al. |
| 2007/0168336 A1 | 7/2007 | Ransil et al. |
| 2007/0168656 A1 | 7/2007 | Paganetti et al. |
| 2007/0198641 A1 | 8/2007 | Dorai et al. |
| 2007/0208669 A1 | 9/2007 | Rivette et al. |
| 2007/0233672 A1 | 10/2007 | Sanfacon et al. |
| 2007/0283194 A1 | 12/2007 | Villella et al. |
| 2008/0010337 A1 | 1/2008 | Hayes et al. |
| 2008/0033927 A1 | 2/2008 | Richards et al. |
| 2008/0065591 A1 | 3/2008 | Guzenda |
| 2008/0071755 A1 | 3/2008 | Barsness et al. |
| 2008/0133235 A1 | 6/2008 | Simoneau et al. |
| 2008/0162592 A1 | 7/2008 | Huang et al. |
| 2008/0172357 A1 | 7/2008 | Rechis et al. |
| 2008/0192280 A1 | 8/2008 | Masuyama et al. |
| 2008/0208844 A1 | 8/2008 | Jenkins |
| 2008/0215546 A1 | 9/2008 | Baum et al. |
| 2008/0275857 A1 | 11/2008 | Dettinger et al. |
| 2008/0294660 A1 | 11/2008 | Patterson et al. |
| 2008/0300835 A1 | 12/2008 | Hixon |
| 2009/0006148 A1 | 1/2009 | Bacalski et al. |
| 2009/0006527 A1 | 1/2009 | Gingell et al. |
| 2009/0007125 A1 | 1/2009 | Barsness et al. |
| 2009/0125526 A1 | 5/2009 | Neufeld |
| 2009/0129163 A1 | 5/2009 | Danilak |
| 2009/0132488 A1 | 5/2009 | Wehrmeister et al. |
| 2009/0183162 A1 | 7/2009 | Kindel et al. |
| 2009/0193042 A1 | 7/2009 | Hornibrook et al. |
| 2009/0204551 A1 | 8/2009 | Wang et al. |
| 2009/0216781 A1 | 8/2009 | Chauvet et al. |
| 2009/0234799 A1 | 9/2009 | Betawadkar-Norwood et al. |

(56) References Cited

U.S. PATENT DOCUMENTS

| | | |
|---|---|---|
| 2009/0248764 A1 | 10/2009 | Day et al. |
| 2009/0284530 A1 | 11/2009 | Lester et al. |
| 2009/0292810 A1 | 11/2009 | Hotta et al. |
| 2009/0327242 A1 | 12/2009 | Brown et al. |
| 2010/0005056 A1 | 1/2010 | Bayliss |
| 2010/0005134 A1 | 1/2010 | Zamir et al. |
| 2010/0005151 A1 | 1/2010 | Gokhale |
| 2010/0011031 A1 | 1/2010 | Huang et al. |
| 2010/0011252 A1 | 1/2010 | Rivoir |
| 2010/0106934 A1 | 4/2010 | Calder et al. |
| 2010/0125565 A1 | 5/2010 | Burger et al. |
| 2010/0153285 A1 | 6/2010 | Anderson et al. |
| 2010/0153375 A1 | 6/2010 | Bilas et al. |
| 2010/0153431 A1 | 6/2010 | Burger |
| 2010/0199042 A1 | 8/2010 | Bates et al. |
| 2010/0229108 A1 | 9/2010 | Gerson et al. |
| 2010/0262740 A1 | 10/2010 | Borchers et al. |
| 2010/0332461 A1 | 12/2010 | Friedman et al. |
| 2011/0047169 A1 | 2/2011 | Leighton et al. |
| 2011/0055231 A1 | 3/2011 | Huck et al. |
| 2011/0060887 A1 | 3/2011 | Thatcher et al. |
| 2011/0078133 A1 | 3/2011 | Bordawekar et al. |
| 2011/0093491 A1 | 4/2011 | Zabback et al. |
| 2011/0099500 A1 | 4/2011 | Smith et al. |
| 2011/0125745 A1 | 5/2011 | Bright |
| 2011/0131200 A1 | 6/2011 | Zhou et al. |
| 2011/0173184 A1 | 7/2011 | Kelshikar et al. |
| 2011/0191373 A1 | 8/2011 | Botros et al. |
| 2011/0196804 A1 | 8/2011 | Sutter et al. |
| 2011/0213765 A1 | 9/2011 | Cui et al. |
| 2011/0213778 A1 | 9/2011 | Hess et al. |
| 2011/0213870 A1 | 9/2011 | Cai et al. |
| 2011/0225192 A1* | 9/2011 | Imig .................. G06F 16/3325 707/775 |
| 2011/0231858 A1 | 9/2011 | Sampathkumar et al. |
| 2011/0246294 A1 | 10/2011 | Robb et al. |
| 2011/0289163 A1 | 11/2011 | Edwards et al. |
| 2011/0295838 A1 | 12/2011 | Collins et al. |
| 2011/0295968 A1 | 12/2011 | Takaoka et al. |
| 2011/0320550 A1 | 12/2011 | Lawson et al. |
| 2012/0005308 A1 | 1/2012 | Cok |
| 2012/0066205 A1 | 3/2012 | Chappell et al. |
| 2012/0078869 A1 | 3/2012 | Bellville et al. |
| 2012/0078881 A1 | 3/2012 | Crump et al. |
| 2012/0078975 A1 | 3/2012 | Chen et al. |
| 2012/0079004 A1 | 3/2012 | Herman |
| 2012/0130986 A1 | 5/2012 | Abdellatif et al. |
| 2012/0130988 A1 | 5/2012 | Nica et al. |
| 2012/0130997 A1 | 5/2012 | Risvik et al. |
| 2012/0143873 A1 | 6/2012 | Saadat |
| 2012/0150819 A1 | 6/2012 | Lindahl et al. |
| 2012/0166440 A1 | 6/2012 | Shmueli et al. |
| 2012/0173728 A1 | 7/2012 | Haskins et al. |
| 2012/0197856 A1 | 8/2012 | Banka et al. |
| 2012/0197934 A1 | 8/2012 | Zhang et al. |
| 2012/0226712 A1 | 9/2012 | Vermeulen et al. |
| 2012/0254269 A1 | 10/2012 | Carmichael |
| 2012/0278346 A1 | 11/2012 | Han et al. |
| 2012/0284331 A1 | 11/2012 | Kamtatla et al. |
| 2012/0310916 A1 | 12/2012 | Abadi et al. |
| 2013/0018868 A1 | 1/2013 | Chi et al. |
| 2013/0054649 A1 | 2/2013 | Potapov et al. |
| 2013/0060783 A1 | 3/2013 | Baum et al. |
| 2013/0066674 A1 | 3/2013 | Vasters |
| 2013/0067564 A1 | 3/2013 | Fok Ah Chuen et al. |
| 2013/0084826 A1 | 4/2013 | Mo et al. |
| 2013/0086040 A1 | 4/2013 | Patadia et al. |
| 2013/0097139 A1 | 4/2013 | Thoresen et al. |
| 2013/0110828 A1 | 5/2013 | Meyerzon et al. |
| 2013/0132392 A1 | 5/2013 | Kenedy et al. |
| 2013/0138626 A1 | 5/2013 | Delafranier et al. |
| 2013/0159251 A1 | 6/2013 | Skrenta et al. |
| 2013/0159324 A1* | 6/2013 | Xu ...................... G06F 16/2471 707/754 |
| 2013/0166502 A1 | 6/2013 | Walkauskas |
| 2013/0173160 A1 | 7/2013 | Meisels et al. |
| 2013/0173662 A1 | 7/2013 | Kaplinger et al. |
| 2013/0198475 A1 | 8/2013 | Serlet et al. |
| 2013/0204991 A1 | 8/2013 | Skjolsvold et al. |
| 2013/0212165 A1 | 8/2013 | Vermeulen et al. |
| 2013/0226971 A1 | 8/2013 | Shoolman et al. |
| 2013/0232187 A1 | 9/2013 | Workman et al. |
| 2013/0238663 A1* | 9/2013 | Mead .................... G06F 16/951 707/792 |
| 2013/0238706 A1 | 9/2013 | Desai |
| 2013/0246373 A1 | 9/2013 | Hansma et al. |
| 2013/0246608 A1 | 9/2013 | Liu et al. |
| 2013/0254761 A1 | 9/2013 | Reddy et al. |
| 2013/0311488 A1 | 11/2013 | Erdogan et al. |
| 2013/0318236 A1 | 11/2013 | Coates et al. |
| 2013/0318536 A1 | 11/2013 | Fletcher et al. |
| 2013/0325850 A1 | 12/2013 | Redmond et al. |
| 2013/0339298 A1 | 12/2013 | Muller et al. |
| 2013/0339567 A1 | 12/2013 | Carpentier et al. |
| 2014/0052733 A1 | 2/2014 | Blank, Jr. et al. |
| 2014/0067759 A1 | 3/2014 | Aguilera et al. |
| 2014/0067792 A1 | 3/2014 | Erdogan et al. |
| 2014/0068343 A1 | 3/2014 | Nakajima et al. |
| 2014/0074810 A1 | 3/2014 | Wang et al. |
| 2014/0089511 A1 | 3/2014 | McLean |
| 2014/0095470 A1 | 4/2014 | Chen et al. |
| 2014/0122117 A1 | 5/2014 | Masarie, Jr. et al. |
| 2014/0129515 A1 | 5/2014 | Venkatesan et al. |
| 2014/0149355 A1 | 5/2014 | Gupta et al. |
| 2014/0149725 A1 | 5/2014 | Gherman et al. |
| 2014/0156642 A1 | 6/2014 | Johnson et al. |
| 2014/0180651 A1 | 6/2014 | Lysak et al. |
| 2014/0181373 A1 | 6/2014 | George et al. |
| 2014/0188841 A1 | 7/2014 | Sun et al. |
| 2014/0188885 A1 | 7/2014 | Kulkarni et al. |
| 2014/0189858 A1 | 7/2014 | Chen et al. |
| 2014/0195558 A1 | 7/2014 | Murthy et al. |
| 2014/0214799 A1 | 7/2014 | Li et al. |
| 2014/0214811 A1 | 7/2014 | Aramaki |
| 2014/0236889 A1 | 8/2014 | Vasan et al. |
| 2014/0236890 A1 | 8/2014 | Vasan et al. |
| 2014/0244585 A1 | 8/2014 | Sivasubramanian et al. |
| 2014/0258295 A1 | 9/2014 | Wang et al. |
| 2014/0278652 A1 | 9/2014 | Joyner et al. |
| 2014/0280021 A1 | 9/2014 | Singamshetty |
| 2014/0289414 A1 | 9/2014 | Chan et al. |
| 2014/0317084 A1 | 10/2014 | Chaudhry et al. |
| 2014/0324862 A1 | 10/2014 | Bingham et al. |
| 2014/0359598 A1 | 12/2014 | Oliver et al. |
| 2014/0379691 A1 | 12/2014 | Teletia et al. |
| 2014/0380322 A1 | 12/2014 | Ailamaki et al. |
| 2015/0019537 A1 | 1/2015 | Neels et al. |
| 2015/0039641 A1 | 2/2015 | Neeman et al. |
| 2015/0039650 A1* | 2/2015 | Andrews ............. G06F 16/2471 707/770 |
| 2015/0039757 A1 | 2/2015 | Petersen et al. |
| 2015/0049163 A1 | 2/2015 | Smurro |
| 2015/0052125 A1 | 2/2015 | Ellis et al. |
| 2015/0058293 A1 | 2/2015 | Kobayashi et al. |
| 2015/0074819 A1 | 3/2015 | Borenstein |
| 2015/0095570 A1 | 4/2015 | Lee |
| 2015/0100412 A1 | 4/2015 | Sterns et al. |
| 2015/0100616 A1 | 4/2015 | Imamura |
| 2015/0112966 A1 | 4/2015 | Tokuda et al. |
| 2015/0113162 A1 | 4/2015 | Chan et al. |
| 2015/0120684 A1 | 4/2015 | Bawaskar et al. |
| 2015/0134795 A1 | 5/2015 | Theimer et al. |
| 2015/0134796 A1 | 5/2015 | Theimer et al. |
| 2015/0149440 A1 | 5/2015 | Bornea et al. |
| 2015/0149501 A1 | 5/2015 | Prakash et al. |
| 2015/0149507 A1 | 5/2015 | Imaki |
| 2015/0149509 A1 | 5/2015 | Leu et al. |
| 2015/0149879 A1 | 5/2015 | Miller et al. |
| 2015/0161211 A1 | 6/2015 | Patel et al. |
| 2015/0161237 A1 | 6/2015 | Agarwal et al. |
| 2015/0161239 A1 | 6/2015 | Stepinski et al. |
| 2015/0169684 A1 | 6/2015 | Li et al. |
| 2015/0169686 A1 | 6/2015 | Eliás et al. |
| 2015/0169786 A1 | 6/2015 | Jerzak et al. |

(56) References Cited

U.S. PATENT DOCUMENTS

| | | |
|---|---|---|
| 2015/0172148 A1 | 6/2015 | Ishida et al. |
| 2015/0180891 A1 | 6/2015 | Seward et al. |
| 2015/0188969 A1 | 7/2015 | Boshev et al. |
| 2015/0189033 A1 | 7/2015 | Han et al. |
| 2015/0199267 A1 | 7/2015 | Oh et al. |
| 2015/0199347 A1 | 7/2015 | Shnitko et al. |
| 2015/0207857 A1 | 7/2015 | Horton |
| 2015/0213631 A1 | 7/2015 | Vander Broek |
| 2015/0220601 A1 | 8/2015 | Leyba |
| 2015/0227624 A1 | 8/2015 | Busch et al. |
| 2015/0234682 A1 | 8/2015 | Dageville et al. |
| 2015/0244795 A1 | 8/2015 | Cantwell et al. |
| 2015/0254245 A1 | 9/2015 | Marais et al. |
| 2015/0254346 A1 | 9/2015 | Chang et al. |
| 2015/0295796 A1 | 10/2015 | Hsiao et al. |
| 2015/0295848 A1 | 10/2015 | Vlachogiannis et al. |
| 2015/0304879 A1 | 10/2015 | daCosta |
| 2015/0319256 A1 | 11/2015 | Casey |
| 2015/0324433 A1 | 11/2015 | Duffy et al. |
| 2015/0339312 A1 | 11/2015 | Lin et al. |
| 2015/0339357 A1 | 11/2015 | Carasso et al. |
| 2015/0341212 A1 | 11/2015 | Hsiao et al. |
| 2015/0347443 A1 | 12/2015 | Reid et al. |
| 2015/0347993 A1 | 12/2015 | Redmond et al. |
| 2015/0356153 A1 | 12/2015 | Schoening |
| 2015/0358433 A1 | 12/2015 | Parthasarathy et al. |
| 2015/0379672 A1 | 12/2015 | Wang |
| 2015/0381725 A1 | 12/2015 | Haapaoja et al. |
| 2016/0026438 A1 | 1/2016 | Wolfram |
| 2016/0026684 A1 | 1/2016 | Mukherjee et al. |
| 2016/0027041 A1 | 1/2016 | Zhong et al. |
| 2016/0042039 A1 | 2/2016 | Kaufmann et al. |
| 2016/0044108 A1 | 2/2016 | Vermeulen et al. |
| 2016/0048408 A1 | 2/2016 | Madhu et al. |
| 2016/0050129 A1 | 2/2016 | Hoyne |
| 2016/0050261 A1 | 2/2016 | McDaid et al. |
| 2016/0055184 A1 | 2/2016 | Fokoue-Nkoutche et al. |
| 2016/0063037 A1 | 3/2016 | Savkli |
| 2016/0063209 A1 | 3/2016 | Malaviya |
| 2016/0070750 A1 | 3/2016 | Beutlberger et al. |
| 2016/0085639 A1 | 3/2016 | Abouzour et al. |
| 2016/0085810 A1 | 3/2016 | de Castro Alves et al. |
| 2016/0087880 A1 | 3/2016 | Shalita et al. |
| 2016/0092493 A1 | 3/2016 | Ko et al. |
| 2016/0092541 A1 | 3/2016 | Liu et al. |
| 2016/0092558 A1 | 3/2016 | Ago et al. |
| 2016/0092570 A1 | 3/2016 | Ago et al. |
| 2016/0092588 A1 | 3/2016 | Li |
| 2016/0103659 A1 | 4/2016 | Tijanic et al. |
| 2016/0110109 A1 | 4/2016 | Cowling et al. |
| 2016/0112531 A1 | 4/2016 | Milton et al. |
| 2016/0117129 A1 | 4/2016 | Shrader et al. |
| 2016/0117158 A1 | 4/2016 | MacCleery et al. |
| 2016/0117373 A1 | 4/2016 | Dang et al. |
| 2016/0139849 A1 | 5/2016 | Chaw et al. |
| 2016/0140174 A1 | 5/2016 | Weyerhaeuser et al. |
| 2016/0140196 A1 | 5/2016 | Kobayashi et al. |
| 2016/0150002 A1 | 5/2016 | Hildrum et al. |
| 2016/0156579 A1 | 6/2016 | Kaufmann |
| 2016/0162478 A1 | 6/2016 | Blassin et al. |
| 2016/0170987 A1 | 6/2016 | Kesselman |
| 2016/0180557 A1 | 6/2016 | Yousaf et al. |
| 2016/0188669 A1 | 6/2016 | Duffy et al. |
| 2016/0188742 A1 | 6/2016 | Ingvoldstad et al. |
| 2016/0203135 A1 | 7/2016 | Bhattacharjee et al. |
| 2016/0210340 A1 | 7/2016 | Cai et al. |
| 2016/0212007 A1 | 7/2016 | Alatorre et al. |
| 2016/0253361 A1 | 9/2016 | Nguyen et al. |
| 2016/0283511 A1 | 9/2016 | Fokoue-Nkoutche et al. |
| 2016/0283528 A1 | 9/2016 | Benke et al. |
| 2016/0286013 A1 | 9/2016 | Yu et al. |
| 2016/0291942 A1 | 10/2016 | Hutchison |
| 2016/0292166 A1 | 10/2016 | Russell |
| 2016/0306849 A1 | 10/2016 | Curino et al. |
| 2016/0316014 A1 | 10/2016 | Radu et al. |
| 2016/0335062 A1 | 11/2016 | Teodorescu et al. |
| 2016/0335352 A1 | 11/2016 | Teodorescu et al. |
| 2016/0343093 A1 | 11/2016 | Riland et al. |
| 2016/0357828 A1 | 12/2016 | Tobin et al. |
| 2016/0364093 A1 | 12/2016 | Denton et al. |
| 2016/0364424 A1 | 12/2016 | Chang et al. |
| 2016/0371356 A1 | 12/2016 | Lee et al. |
| 2016/0373521 A1 | 12/2016 | Washbrook et al. |
| 2017/0006135 A1 | 1/2017 | Siebel et al. |
| 2017/0010947 A1 | 1/2017 | Lu et al. |
| 2017/0011039 A1 | 1/2017 | Spaulding et al. |
| 2017/0012909 A1 | 1/2017 | Lieu |
| 2017/0024390 A1 | 1/2017 | Vuppala et al. |
| 2017/0024912 A1 | 1/2017 | de Castro Alves et al. |
| 2017/0026441 A1 | 1/2017 | Moudy et al. |
| 2017/0031599 A1 | 2/2017 | Bowman et al. |
| 2017/0031937 A1 | 2/2017 | Bowman et al. |
| 2017/0031988 A1 | 2/2017 | Sun et al. |
| 2017/0034023 A1 | 2/2017 | Nickolov et al. |
| 2017/0039239 A1 | 2/2017 | Saadat-Panah et al. |
| 2017/0046374 A1 | 2/2017 | Fletcher et al. |
| 2017/0046445 A1 | 2/2017 | Cormier et al. |
| 2017/0060903 A1 | 3/2017 | Botea et al. |
| 2017/0061286 A1 | 3/2017 | Kumar et al. |
| 2017/0068678 A1 | 3/2017 | Tripathi et al. |
| 2017/0083368 A1 | 3/2017 | Bishop et al. |
| 2017/0083386 A1 | 3/2017 | Wing et al. |
| 2017/0083588 A1 | 3/2017 | Lang et al. |
| 2017/0097957 A1 | 4/2017 | Bourbonnais et al. |
| 2017/0103116 A1 | 4/2017 | Hu et al. |
| 2017/0109378 A1 | 4/2017 | Brewster et al. |
| 2017/0111675 A1 | 4/2017 | Song et al. |
| 2017/0116289 A1 | 4/2017 | Deshmukh et al. |
| 2017/0124151 A1 | 5/2017 | Ji et al. |
| 2017/0147224 A1 | 5/2017 | Kumar et al. |
| 2017/0147640 A1 | 5/2017 | Gaza et al. |
| 2017/0149624 A1 | 5/2017 | Chitti et al. |
| 2017/0149625 A1 | 5/2017 | Chitti et al. |
| 2017/0154057 A1 | 6/2017 | Wu et al. |
| 2017/0169336 A1 | 6/2017 | Singhal et al. |
| 2017/0170990 A1 | 6/2017 | Gaddehosur et al. |
| 2017/0177697 A1 | 6/2017 | Lee et al. |
| 2017/0178253 A1 | 6/2017 | Koufogiannakis et al. |
| 2017/0180289 A1 | 6/2017 | Chiappone et al. |
| 2017/0185574 A1 | 6/2017 | Fern et al. |
| 2017/0185648 A1 | 6/2017 | Kavulya et al. |
| 2017/0199809 A1 | 7/2017 | Michelsen |
| 2017/0199910 A1 | 7/2017 | Konik et al. |
| 2017/0213257 A1 | 7/2017 | Murugesan et al. |
| 2017/0219357 A1 | 8/2017 | Pfeifle |
| 2017/0220685 A1 | 8/2017 | Yan et al. |
| 2017/0228257 A1 | 8/2017 | Dong et al. |
| 2017/0228460 A1 | 8/2017 | Amel et al. |
| 2017/0242630 A1 | 8/2017 | Kephart et al. |
| 2017/0243132 A1 | 8/2017 | Sainani et al. |
| 2017/0255790 A1 | 9/2017 | Barrett et al. |
| 2017/0262551 A1 | 9/2017 | Cho et al. |
| 2017/0286507 A1 | 10/2017 | Hosogi et al. |
| 2017/0286518 A1 | 10/2017 | Horowitz et al. |
| 2017/0300536 A1 | 10/2017 | Gupta et al. |
| 2017/0300702 A1 | 10/2017 | Tegegne et al. |
| 2017/0308573 A1 | 10/2017 | Brisebois et al. |
| 2017/0329543 A1 | 11/2017 | Slater et al. |
| 2017/0344609 A1 | 11/2017 | Wadley et al. |
| 2017/0373935 A1 | 12/2017 | Subramanian et al. |
| 2018/0004745 A1 | 1/2018 | Finkelstein et al. |
| 2018/0011655 A1 | 1/2018 | Gredler et al. |
| 2018/0032478 A1 | 2/2018 | Felderman et al. |
| 2018/0032570 A1 | 2/2018 | Miller et al. |
| 2018/0046503 A1 | 2/2018 | Feng et al. |
| 2018/0052765 A1 | 2/2018 | Imbierski |
| 2018/0060325 A1 | 3/2018 | Taylor et al. |
| 2018/0060389 A1 | 3/2018 | Hwang |
| 2018/0060395 A1 | 3/2018 | Pathak et al. |
| 2018/0060399 A1 | 3/2018 | Lee et al. |
| 2018/0060586 A1 | 3/2018 | Xiao et al. |
| 2018/0074752 A1 | 3/2018 | Nakazono et al. |
| 2018/0075097 A1 | 3/2018 | Hwang |
| 2018/0081579 A1 | 3/2018 | Verrilli et al. |

(56) References Cited

U.S. PATENT DOCUMENTS

| | | |
|---|---|---|
| 2018/0081941 A1 | 3/2018 | Foebel et al. |
| 2018/0089265 A1 | 3/2018 | Gerard |
| 2018/0089267 A1 | 3/2018 | Hatem et al. |
| 2018/0089272 A1 | 3/2018 | Bath et al. |
| 2018/0089276 A1 | 3/2018 | Victor et al. |
| 2018/0089324 A1 | 3/2018 | Pal et al. |
| 2018/0113902 A1 | 4/2018 | Chen et al. |
| 2018/0121426 A1 | 5/2018 | Barsness et al. |
| 2018/0123918 A1 | 5/2018 | Steinhauser et al. |
| 2018/0157711 A1 | 6/2018 | Lee |
| 2018/0159782 A1 | 6/2018 | Madan et al. |
| 2018/0165331 A1 | 6/2018 | Zhang et al. |
| 2018/0173753 A1 | 6/2018 | Pei et al. |
| 2018/0173759 A1 | 6/2018 | Barsness et al. |
| 2018/0205672 A1 | 7/2018 | Dong et al. |
| 2018/0218017 A1 | 8/2018 | Milrud |
| 2018/0218045 A1 | 8/2018 | Pal et al. |
| 2018/0225095 A1 | 8/2018 | Kamalakantha et al. |
| 2018/0285417 A1 | 10/2018 | Lazovic et al. |
| 2018/0307735 A1 | 10/2018 | Thayer et al. |
| 2018/0322017 A1 | 11/2018 | Maccanti et al. |
| 2018/0322168 A1 | 11/2018 | Levine et al. |
| 2018/0348715 A1 | 12/2018 | Bandaru et al. |
| 2018/0349095 A1 | 12/2018 | Wu et al. |
| 2018/0373756 A1 | 12/2018 | Madala |
| 2019/0028571 A1 | 1/2019 | Tomiyama |
| 2019/0050579 A1 | 1/2019 | Abraham et al. |
| 2019/0042146 A1 | 2/2019 | Wysoczanski et al. |
| 2019/0065278 A1 | 2/2019 | Jeuk et al. |
| 2019/0065553 A1 | 2/2019 | Young et al. |
| 2019/0095241 A1 | 3/2019 | Ago et al. |
| 2019/0098106 A1 | 3/2019 | Mungel et al. |
| 2019/0109848 A1 | 4/2019 | Clark et al. |
| 2019/0138642 A1 | 5/2019 | Pal et al. |
| 2019/0229924 A1 | 7/2019 | Chhabra et al. |
| 2019/0236182 A1 | 8/2019 | Tiyyagura et al. |
| 2019/0236203 A1 | 8/2019 | De Boer |
| 2019/0294344 A1 | 9/2019 | Hahn et al. |
| 2019/0340291 A1 | 11/2019 | Raman et al. |
| 2019/0349426 A1 | 11/2019 | Smith et al. |
| 2019/0355022 A1 | 11/2019 | Hertel et al. |
| 2019/0379650 A1 | 12/2019 | Hale et al. |
| 2020/0050586 A1 | 2/2020 | Pal et al. |
| 2020/0050607 A1 | 2/2020 | Pal et al. |
| 2020/0050612 A1 | 2/2020 | Bhattacharjee et al. |
| 2020/0057818 A1 | 2/2020 | Kim |
| 2020/0133916 A1 | 4/2020 | Liao et al. |
| 2020/0301941 A1 | 9/2020 | Wilson et al. |
| 2020/0327252 A1 | 10/2020 | McFall et al. |
| 2020/0364141 A1 | 11/2020 | Shinha et al. |
| 2020/0364279 A1 | 11/2020 | Pal et al. |
| 2020/0401591 A1 | 12/2020 | Bhoite et al. |
| 2020/0409948 A1* | 12/2020 | Corvinelli .............. G06N 3/047 |
| 2021/0019557 A1 | 1/2021 | Jothi et al. |
| 2021/0034623 A1 | 2/2021 | Sabhanatarajan et al. |
| 2021/0034625 A1 | 2/2021 | Shah et al. |
| 2021/0049177 A1 | 2/2021 | Bhattacharjee et al. |
| 2021/0109902 A1 | 4/2021 | Glasser |
| 2021/0149895 A1 | 5/2021 | Tran et al. |
| 2021/0224051 A1 | 7/2021 | Bequet et al. |
| 2021/0303570 A1 | 9/2021 | Kondiles et al. |
| 2021/0390103 A1 | 12/2021 | Cejudo et al. |
| 2022/0207084 A1* | 6/2022 | Al-Omari ........... G06F 16/2453 |
| 2022/0269727 A1 | 8/2022 | Batsakis et al. |
| 2022/0327125 A1 | 10/2022 | Pal et al. |
| 2022/0327149 A1 | 10/2022 | Pal et al. |
| 2023/0072930 A1 | 3/2023 | Shah et al. |
| 2023/0130267 A1 | 4/2023 | Mukherjee et al. |
| 2023/0315757 A1 | 10/2023 | DiPalma et al. |
| 2024/0086471 A1 | 3/2024 | Pal et al. |
| 2024/0178001 A1* | 5/2024 | Li .......................... H10B 41/20 |
| 2024/0220497 A1 | 7/2024 | Pal et al. |

FOREIGN PATENT DOCUMENTS

| | | |
|---|---|---|
| CN | 107506447 A | 12/2017 |
| CN | 109299110 A | 2/2019 |
| CN | 109416643 A | 3/2019 |
| EP | 2453370 A1 | 5/2012 |
| EP | 3675418 | 7/2020 |
| KR | 20200004835 | 1/2020 |
| WO | WO 2007/062429 A2 | 5/2007 |
| WO | WO 2020/027867 | 2/2020 |
| WO | WO 2020/220216 | 11/2020 |

OTHER PUBLICATIONS

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Carraso, David, "Exploring Splunk," published by CITO Research, New York, NY, Apr. 2012.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

SLAML 10 Reports, Workshop On Managing Systems via Log Analysis and Machine Learning Techniques, ;login: Feb. 2011 Conference Reports.

Bakliwal S., "A Comprehensive Guide to Apache Flink Ecosystem Components," published Feb. 17, 2017; 7 pages.

Beame et al., "Communication Steps for Parallel Query Processing", PODS '13: Proceedings of the 32nd ACM SIGMOD-SIGACT-SIGAI Symposium on Principles of Database Systems; Jun. 2013, pp. 273-284.

Chen et al., "ParaLite: Supporting Collective Queries in Database System to Parallelize User-Defined Executable," 2012 12th IEEE/ACM International Symposium on Cluster, Clout and Grid Computing, IEEE Computer Society, pp. 474-481, May 2012.

Dayal U., "Of Nests and Trees: A Unified Approach to Processing Queries That Contain Nested Subqueries, Aggregates, and Quantifiers." Proceedings of the 13th Int'l Conference on Very Large Data Bases [VLDB], Brighton, 1987, pp. 197-208.

Di et al., "Social-optimized Win-win Resource Allocation for Self-organizing Cloud". In 2011 IEEE Int Conf on Cloud and Service Computing Dec. 12, 2011; 251-258.

Ejarque et al., "Using Semantics for Resource Allocation in Computing Service Providers". In 2008 EEE Int Conf on Services Computing Jul. 7, 2008; 2: 583-587.

Friedman, et al., SQL/MapReduce: A Practical Approach to Self-Describing, Polymorphic, and Parallelizable Use-Defined Functions, Proc. VLDB Endow, 2 pages 1402-1413 Aug. 2009.

Gotz et al., "A methodology for interactive mining and visual analysis of clinical event patterns using electronic health record data". Journal Biomed Info. Apr. 1, 2014;48: 148-159.

Han et al., "Elastic Allocator: An Adaptive Task Scheduler for Streaming Query in the Cloud," IEEE Computer Society—2014, IEEE 8th International Symposium on Service Oriented System Engineering, pp. 284-289, 2014.

Hu et al., Dynamic Optimization of Subquery Processing in Grid Database, Third International Conference on Natural Communication, 6 pages, vol. 5, Nov. 2007.

Huang et al., "Query-aware Locality-sensitive Hashing for Approximate Nearest Neighbor Search", In Proceedings of the VLDB Endowment. Sep. 1, 2015;9(1):1-2 in 12 pages.

Hull et al., "Querying Across Languages: A Dictionary-Based Approach to Multilingual Information Retrieval." Proceedings of the 19th Annual International ACM SIGIR Conference on Research and Development in Information Retrieval Aug. 18, 1996; pp. 49-57.

Jayaram, SQLShack: "SQL Union overview, usage, and examples," https://sqlshack.com/sql/sql-sub-queries.htm. 2021, in 13 pages.

(56) References Cited

OTHER PUBLICATIONS

Kafka + Flink: A Practical, How-To Guide, Sep. 2, 2015 by R. Metzger; retrieved from https://www.ververica.com/blog/kafka-flink-a-practical-how-to; 13 pages.

Keystone Real-time Stream Processing Platform, The Netflix Tech Blog, Sep. 10, 2018, retrieved from https://netflixtechblog.com/keystone-real-time-stream-processing-platform-a3ee651812a?gi=71cc12ef6b89.

Kuo et al., "Query Expansion for Hash-based Image Object Retrieval", In Proceedings of the 17th ACM international conference on Multimedia Oct. 19, 2009 (pp. 65-74).

Limsopatham et al., "Learning to Combine Representations for Medical Records Search". SIGIR'13, Jul. 28-Aug. 1, 2013, ACM 2013; pp. 833-836.

McNamee et al., "Comparing Cross-Language Query Expansion Techniques by Degrading Translation Resources." Proceedings of the 25th Annual International ACM SIGIR Conference on Research and Development in Information Retrieval Aug. 11, 2002; pp. 159-166.

Myers W., "Skating Out the Graphics Display Pipeline". IEEE Computer Graphics & Applications, Jul. 1984;4(7): 60-65.

Nadanam et al., "QoS Evaluation for Web Services In Cloud computing," IEEE, 2012, ICCCNT'12, Jul. 26-28, 2012, Coimbatore, India.

Netflix Keystone SPaaS: Real-time Stream Processing as a Service—ABD320—re:Invent 2017 clip slide, retrieved from https://www.slideshare.net/AmazonWebServices/netflix-keystone-spaas-realtime-stream-processing-as-a-service-abd320-reinvent-2017.

Nguyen et al., "An IndexScheme for Similarity Search on Cloud Computing using MapReduce over Docker Container," IMCOM '16: Proceedings of the 10 International Conferenceon Ubiquitous Information Management and Communication Jan. 2016 Article No. 60 pp. 1-6 9year: 2016).

Pääkkönen et al., "Reference Architecture and Classification of Technologies, Products and Services for Big Data Systems," Big Data Research vol. 2, Issue 4, Dec. 2015, pp. 166-186.

Smith et al., "Distributed Query Processing on the Grid," In Grid Computing—GRID 2002: Third International Workshop Baltimore, MD, USA, Nov. 18, 2002 Proceedings 3 2002 (pp. 279-290). Springer Verlag: Berlin/Heidelberg. (12 pages).

"Subqueries with the Insert Statement," https://www.tutorialspoint.com/sql/sql-sub-queries.htm. (Mar. 8, 2021); 4 pages.

Vaid K., Workshop on Managing Systems via log Analysis and Machine Learning Techniques (SLAML '10), ;login: vol. 36, No. 1, Oct. 3, 2010, Vancouver, BC, Canada; 7 pages.

Wongsuphasawat et al., "Querying event sequences by exact match or similarity search: Design and empirical evaluation". Interacting with Computers. Mar. 1, 2012;24(2): 55-68.

Wu S., Building Stream Processing as a Service (SPaaS), retrieved from https://cdn.oreillystatic.com/en/assets/1/event/281/Building%20stream%20processing%20as%20a%20service%20at%20Netflix%20Presentation.pdf. Netflix Presentation Dec. 2017; 113 pages.

Yasu et al., Performance of Splunk for the TDAQ Information Service at the ATLAS Experiment, 2014 19th IEEE-NPSS Real Time Conference, 6 pages, May 2014.

Zhu et al., "Combining Multi-level Evidence for Medical Record Retrieval". SHB'12, Oct. 29, 2012, ACM 2012; pp. 49-56.

International Search Report and Written Opinion for PCT Application No. PCT/US2019/016108, mailed Mar. 22, 2019.

International Preliminary Report on Patentability for PCT Application No. PCT/US2019/016108, issued Feb. 2, 2021.

International Search Report and Written Opinion for PCT Application No. PCT/CN2019/085042, dated Feb. 1, 2020.

U.S. Appl. No. 15/967,570, filed Apr. 30, 2018, Sammer et al.
U.S. Appl. No. 15/967,582, filed Apr. 30, 2018, Batsakis et al.
U.S. Appl. No. 15/967,586, filed Apr. 30, 2018, Batsakis et al.
U.S. Appl. No. 15/967,595, filed Apr. 30, 2018, Batsakis et al.
U.S. Appl. No. 16/000,664, filed Jun. 5, 2018, Batsakis et al.
U.S. Appl. No. 16/430,983, filed Jun. 4, 2019, Pal et al.
U.S. Appl. No. 17/233,193, filed Apr. 16, 2021, Batsakis et al.
U.S. Appl. No. 17/445,701, filed Aug. 23, 2021, Batsakis et al.
U.S. Appl. No. 17/589,712, filed Jan. 31, 2022, Batsakis et al.
U.S. Appl. No. 17/661,528, filed Apr. 29, 2022, Rao B.
U.S. Appl. No. 17/661,529, filed Apr. 29, 2022, Rao B.
U.S. Appl. No. 17/816,254, filed Jul. 29, 2022, Arora et al.
U.S. Appl. No. 17/816,132, filed Jul. 29, 2022, Arora et al.
U.S. Appl. No. 18/326,802, filed May 31, 2023, Andrade et al.
U.S. Appl. No. 18/342,671, filed Jun. 27, 2023, Chawla et al.
U.S. Appl. No. 18/496,759, filed Oct. 27, 2023, Bhattacharjee et al.
U.S. Appl. No. 18/420,173, filed Jan. 23, 2024, Pal et al.
U.S. Appl. No. 18/609,798, filed Mar. 19, 2024, Pal et al.
U.S. Appl. No. 18/626,007, filed Apr. 3, 2024, Bhattacharjee et al.
U.S. Appl. No. 18/661,319, filed May 10, 2024, Batsakis et al.
U.S. Appl. No. 18/748,595, filed Jun. 20, 2024, Batsakis et al.
U.S. Appl. No. 18/773,273, filed Jul. 15, 2024, Batsakis et al.

* cited by examiner

RUNTIME SYSTEMS QUERY COORDINATOR

PRIORITY

This U.S. patent application claims priority to U.S. Provisional Application 63/482,530, filed on Jan. 31, 2023, entitled "RUNTIME SYSTEMS QUERY COORDINATOR," the entire contents of which are fully incorporated herein by reference.

BACKGROUND

Information technology (IT) environments can include diverse types of data systems that process, manage, or store large amounts of diverse data types generated by numerous devices.

BRIEF DESCRIPTION OF THE DRAWINGS

Illustrative examples are described in detail below with reference to the following figures.

DETAILED DESCRIPTION

Figure 1:
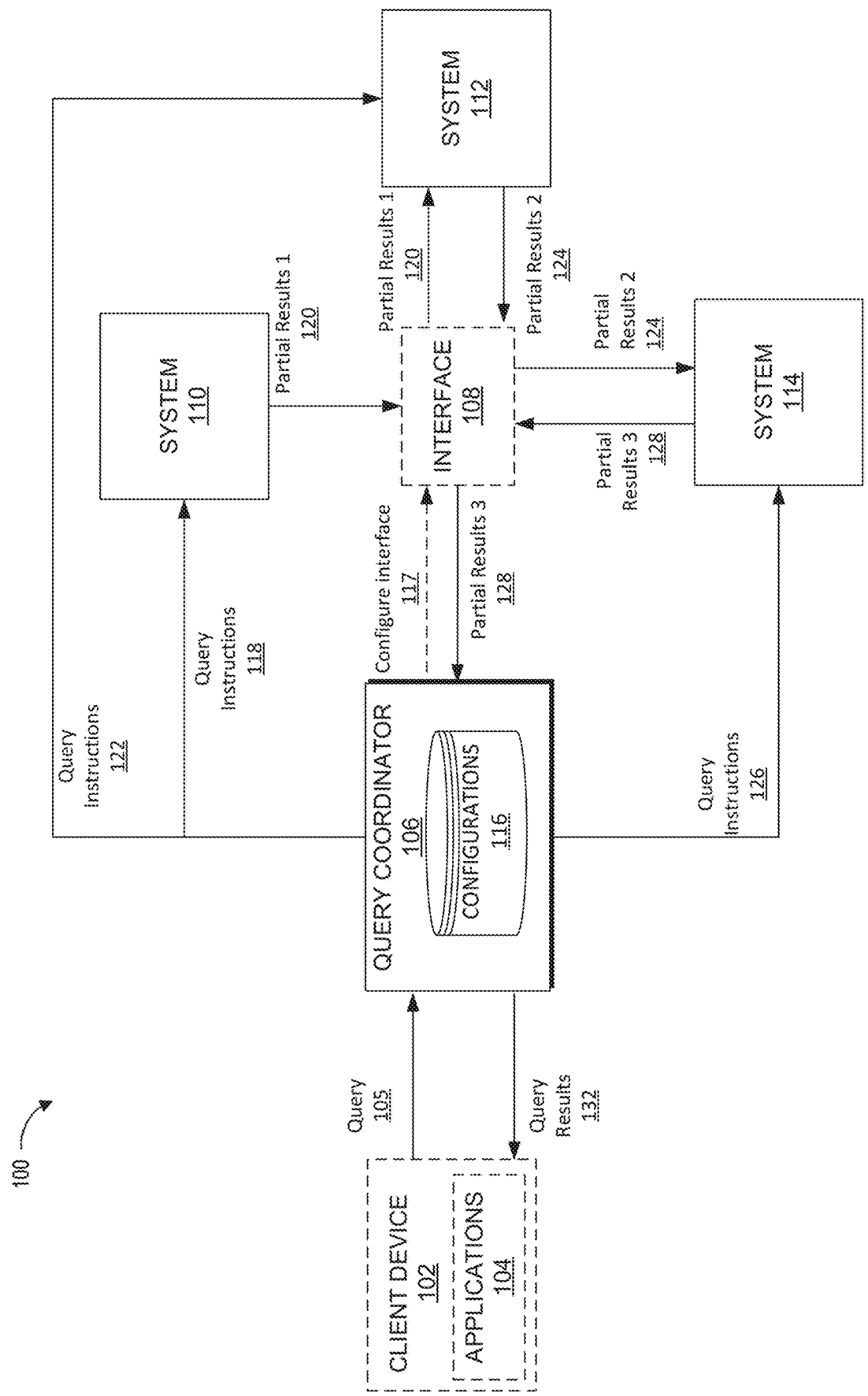
FIG. 1 is a block diagram of an example environment in which an embodiment may be implemented.

Big data environments may include different systems that process different types of data in different ways and/or process data in different states (also referred to herein as different runtime systems). Some example runtime systems include streaming data processing systems that may process streaming data in real-time (e.g., as it is output by/received from a data source and before it is stored in non-volatile memory (e.g., a data store)), batch search systems or database systems that may process data in batches or data at rest (e.g., data pulled from non-volatile memory, such as log data, metrics data, etc.), tracing data processing systems that may process traces corresponding to isolated execution environments (e.g., virtual machines, software containers, etc.) instantiated in a hosted computing environment, and machine learning data processing systems that may process data using a machine learning model (e.g., to identify abnormalities or deviations in the data). Accordingly, the streaming data processing systems, batch search systems/database systems, tracing data processing systems, and machine learning data processing systems may be referred to as different runtime systems.

The different runtime systems may operate independently and provide users with distinct user interfaces that enable the users to use the respective runtime systems. For example, a user may independently and/or separately process data using a streaming data processing system, batch search system, tracing data processing system, and/or a machine learning data processing system, and then view the results via different user interfaces of the respective systems. As such, the data managed, processed, or stored by the various runtime systems may be siloed from each other and therefore it may not be feasible to execute queries that rely on partial results from multiple different runtime systems.

The different runtime systems may also use different computer or query languages to process data. For example, a batch search system may use a query processing language, such as Splunk Processing Language (SPL) or SQL, to identify data to be processed and how to process the data, whereas a streaming data processing system may not use a query processing language and/or may use C or some other computer language to determine how to process the streaming data. Similarly, a tracing data processing system and/or a machine learning data processing system may operate using different computer languages. In some cases, if a requestor of a search query wants query results that involve different runtime systems, the requestor may have to write separate queries for each runtime system in the language of the respective runtime systems.

In addition, as the data from the different runtime systems is managed by the respective runtime systems, a user may be unable to have the different runtime systems process the data in a particular sequence. For example, the user may be unable to use the streaming data processing system to perform some amount of processing on a set of data, use the batch search systems to perform further processing on the set of data (possibly in combination with additional data from the batch search system), and then have the machine learning data processing system perform even more processing on the set of data from the batch search system.

To address these and other potential issues, a query coordinator may be used to coordinate searches between multiple runtime systems. In some cases, the query coordinator may coordinate searches that involve the sequential processing of data by different runtime systems. In certain cases, to coordinate the processing of searches using multiple runtime systems, the query coordinator may configure an inter-system interface that receives results of one runtime system processing data and enables subsequent runtime systems to pull the results and further process them.

As described herein, a query coordinator may receive a search query from a user device or requestor. The query coordinator may parse the search query to identify operations and/or commands associated with the search query. Moreover, the query coordinator may identify different (runtime) systems which relate to the operations and/or commands. The query coordinator may also configure an interface to allow inter-system communication between the different (runtime) systems.

The query coordinator may also distribute tasks to the different (runtime) systems for the different (runtime) systems to execute. Each (runtime) system may participate in the execution of the query based on the tasks received from the query coordinator. In some cases, this may include receiving and processing data from the interface configured by the query coordinator and/or sending partial results to the interface for another (runtime) system or the query coordinator to retrieve. In some cases, the interface may be configured under a publisher subscriber model (pub/sub) and publish results received from one (runtime) system for consumption by another (runtime) system and/or the query coordinator. The query coordinator retrieves results from the interface and finalizes them before communicating the results to the user device or requestor.

Accordingly, the solutions described herein may enable the (sequential) use of multiple (runtime) systems as part of a single query (also referred to herein as a search query) received from a user. As described herein, the query coordinator may enable a user to send a single search query to process data using multiple runtime systems, rather than the user writing multiple queries in different query languages and manually communicating the results of one query from one runtime system to another runtime system for further processing. Moreover, the solutions described herein enable the requestor to be agnostic to the internal workings of the various runtime systems. This allows for a more simple and straightforward process leaving the technical underpinnings (communications between different runtime systems, multiple query processing, etc.) to the query coordinator.

FIG. 1 is a block diagram illustrating an example of a data processing environment 100. In the illustrated example, the environment 100 includes a client device 102, query coordinator 106, inter-system interface 108, and different (runtime) systems 110, 112, and 114, however, it will be understood that the environment 100 may include fewer or more components. For example, the environment 100 may include fewer or more client devices 102, query coordinators 106, interfaces 108, and/or (runtime) systems 110-114.

The systems illustrated in the environment 100 may be communicatively coupled and communicate via one or more networks, such as a wide area network, local area network, private network, etc. In some cases, the query coordinator 106, inter-system interface 108, system 110, system 112, and system 114 may be implemented in separate computing devices and/or separate isolated execution environments (e.g., as virtual machines, software containers, etc.). In some cases, such as when the query coordinator 106, inter-system interface 108, system 110, system 112, and system 114 are implemented as isolated execution environments, the various components may communicate via one or more computer buses.

The client device 102 may include one or more applications 104 being executed by one or more processors of the client device 102. An example client device may include a personal computer, laptop, tablet, phone, or other computing device running a network browser application that enables a user of the client device 102 to communicate with the query coordinator 106.

The query coordinator 106 may be implemented using one or more processors, isolated execution environments (e.g., virtual machines, software container, etc.) and may be used to coordinate the processing and execution of queries between one or more runtime systems 110, 112, and 114. In this way, the query coordinator 106 may function as a coordinator and/or orchestrator of search queries from devices such as client device 102 to one or more runtime systems 110, 112, and 114.

The query coordinator 106 may contain configurations 116 which may be stored in one or more data stores. The configurations 116 may store configurations, mappings, setups, or the like, which may enable the query coordinator 106 to determine what operations and/or commands are associated, and/or are to be used with, what systems. Moreover, the configurations 116 may also store configurations, mappings, setups, and the like, of different systems which may be used by the query coordinator 106 in processing and/or completing search queries. As an example, the configurations 116 may provide the query coordinator 106 information about different systems (e.g., systems 110/112/114, etc.) such that the query coordinator 106 may use this information to connect to and process queries (also subqueries or partial queries, etc.) at these different systems as a part of completing a single search query, and therefore, may require involvement of multiple systems to provide full results of the single search query.

As described herein, the query coordinator 106 may receive a search query and process it to generate tasks for the various runtime systems. As part of processing the query, the query coordinator 106 may parse the query to identify sets of data to be processed as part of the query, query commands to be executed as part of processing the sets of data, and (runtime) systems to be used to execute the query.

In some cases, the commands associated with a search query (e.g., in the query) may correspond to different (runtime) systems that may be separate and distinct from and operate independent of each other and the query coordinator 106. Accordingly, the query coordinator 106 may parse a search query, identify query commands, and use the identified query commands to identify one or more (runtime) systems associated with the query and/or to be used to execute the query (e.g., to execute the particular query command).

In certain cases, the query coordinator 106 may identify the (runtime) systems to use for the query based on the sets of data identified in the query. For example, the query coordinator 106 may determine that a particular set of data is accessible (e.g., stored or managed) by a particular runtime system. As such, the query coordinator 106 may identify the particular runtime system as being associated with the query and/or to be used to execute the query (e.g., to retrieve the particular set of data).

The query coordinator 106 may further generate tasks for the various runtime systems associated with the query. The tasks may include query instructions for the runtime systems. For example, the tasks may indicate the sets of data to be processed by the different runtime systems, where to retrieve the sets of data (e.g., from respective system and/or from the inter-system interface), how to process the retrieved data (e.g., what query commands to perform on the retrieved data), and where to communicate the results (e.g., to the inter-system interface). In some cases, the tasks may include a (sub) search query for the runtime system to execute and/or instructions to communicate the results of the (sub) search query to an (inter-system) interface. In some cases, the query instructions may include a portion of the query received by the query coordinator 106.

The query coordinator 106 may also configure the inter-system interface 108 for use during execution of the query. In some cases, configuring the inter-system interface 108 may include setting up one or more buffers, identifying query results or partial query results of the query as a particular topic, identifying publishers and subscribers to a pub/sub, etc.

Once the query is ready for execution, the query coordinator 106 may initiate execution of the query by sending the query instructions (or tasks) to the various (runtime) systems. During query execution, the query coordinator 106 may monitor the status of the query. For example, the query coordinator 106 may monitor the status of the inter-system interface 108, and/or the different (runtime) systems. In some cases, the query coordinator 106 may ping the various systems to confirm they are still active and/or request a status update regarding the amount of data processed as part of the query. In certain cases, the query coordinator 106 may monitor the amount of data communicated to/from the inter-system interface 108 and/or determine which (runtime) system is pulling data from the inter-system interface 108. For example, if the system 114 is retrieving data from (or communicating data to) the inter-system interface 108, the query coordinator 106 can determine that the query is closer to completion than if the system 110 is communicating data to the inter-system interface 108 and/or if the system 112 is retrieving data from (or communicating data to) the inter-system interface 108.

The query coordinator 106 may also retrieve query results from the inter-system interface 108, finalize the results, and communicate the finalized results to the client device 102 (the requestor of the search query). As described herein, the various (runtime) systems may communicate their results to the inter-system interface 108. In some such cases, the query coordinator 106 may retrieve the query results from the last system (e.g., system 114) to send results to the inter-system interface 108. Upon retrieving the results from the inter-system interface 108, the query coordinator 106 may perform additional processing on the retrieved results. For example, the query coordinator 106 may have generated one or more tasks for itself, such as taking the partial results from each system (system 110, 112, 114, etc.) and formatting such partial results in a manner for presentation on the client device 102. Accordingly, the query coordinator 106 may execute the tasks and communicate the results to the client device 102.

The inter-system interface 108 may be communicatively coupled with the query coordinator 106 and the different (runtime) systems 110, 112, and 114, and be used to facilitate communications between the query coordinator 106 and the different (runtime) systems 110, 112, and 114. Although reference is made to the inter-system interface 108 facilitating communications between different runtime systems, it will be understood that, in some cases, the inter-system interface 108 may facilitate communications between different systems within the same runtime environment. For example, the inter-system interface 108 may facilitate communications between different batch search systems that store data at rest, between different streaming data processing systems, etc.

In some cases, the inter-system interface 108 may operate according to a publish-subscribe ("pub-sub") messaging model. In some cases, a query may be represented as one or more "topics" within a pub/sub model, and the partial search results from the different systems 110, 112, and 114 may be represented as "messages" within the pub/sub model. For example, during execution of a query (Query1), the system 110 may publish its partial results to the inter-system interface 108 as one or more messages associated with the topic corresponding to Query1. The system 112 may retrieve the messages (generated by system 110) from the topic Query1, process the retrieved data (according to its own tasks), and publish it as new messages in the topic Query1. The system 114 may retrieve the messages (generated by system 112), process the retrieved data (according to its own tasks), and publish it as new messages in the topic Query1. The query coordinator 106 may retrieve the messages (generated by system 114), process the retrieved data (according to its own tasks, such as further processing, formatting, etc.), and communicate the search results to the client device 102. In some such cases, the various systems that interact with the inter-system interface 108 may be configured as publishers and subscribers to the Query1 topic.

In certain cases, the query may use multiple "topics" within a pub-sub model. For example, there may be one topic for messages from system 110 to system 112, another topic for messages from system 112 to system 114, and another topic for messages from the system 114 to the query coordinator 106. In certain cases, there may be multiple topics used for communications between systems. As such, the inter-system interface 108 may receive query results from systems, such as systems 110, 112, 114, and publish them for other systems to access. In some such cases, a particular topic may have a first runtime system (e.g., system that places data in the inter-system interface 108 for the topic) as a publisher and another runtime system as a subscriber (e.g., the system that pulls the data from the pub-sub that the first system published).

In some cases, the inter-system interface 108 may be configured by the query coordinator 106. For example, as part of a query planning phase, the query coordinator 106 may configure the inter-system interface 108 to include one or more topics for the query, identify the publishers and subscribers for the topic(s), set up a time out policy (e.g., when to determine that a system is not functioning), set up a message retention policy (e.g., how long to retain messages before removing them), etc. In some cases, as part of the message retention policy, the query coordinator 106 may configure the inter-system interface 108 to remove messages once they have been retrieved from a particular system. For example, once system 112 has retrieved messages generated by the system 110, the inter-system interface 108 may remove the messages generated by the system 110 from the inter-system interface 108.

In certain cases, the query coordinator 106 may configure the inter-system interface 108 to retain messages until a query has been completed. For example, the inter-system interface 108 may retain the messages in the topic(s) associated with a particular search query until it receives a notification from the query coordinator 106 that the query has been completed and/or results have been sent to the client device 102. In some such cases, if a system (e.g., one of systems 110, 112, or 114) goes down during (or communication is lost), the inter-system interface 108 may be used to retrieve messages and partial results that may otherwise be lost. In other words, the inter-system interface 108 may function as a backup or cache for at least messages and/or partial results from systems and/or the query coordinator 106 in the event that any problems and/or issues arise during execution of queries.

Moreover, by retaining messages (and the partial results) between the systems, the inter-system interface 108 may improve the performance of future queries. For example, the query coordinator 106 may make the inter-system messages in the inter-system interface 108 available for a user. By reviewing the inter-system messages, the user may identify an error in the query logic or how the data is being processed. In this way, the inter-system interface 108 may facilitate a better understanding of how the different parts of the query are working (e.g., to see what data is retrieved from system 110 and/or system 112).

The systems 110, 112, and 114 may refer to different runtime systems and may be external to the query coordinator 106. As stated herein, different runtime systems may operate independently and provide users with distinct user interfaces that enable the users to use the respective runtime systems. Moreover, each of systems 110, 112, and 114 may manage, process, or store different data from each other. For example, system 110 may be a streaming data processing system, system 112 may be a batch search system, and system 114 may be a tracing data processing system or a machine learning system. As such, the data processed or managed by the various runtime systems may be separate and/or siloed from each other and therefore the data from these different systems may not be easily shared with one another. Also, the nature of the data of each system may also be different, for example, a streaming data processing system may process (e.g., transform, modify, etc.) (but may not store) streaming data, whereas a batch search system may store and process data at rest, and/or a machine learning system may not process data so much as extract or determine patterns from the data.

A batch search system may correspond to one or more computing devices that conduct batch searches or other batch processing against existing data sets (or data at rest). For example, the batch search system may include an indexing and search system as described below (e.g., the indexing system 420 and search system 460 of FIG. 4). The batch search system may be configured to accept batch operations, such as queries, from a computing device (e.g., via a user interface system) and apply such queries to a data set, which may for example be stored within a data storage system. Such queries may retrieve relevant data, manipulate the data according to one or more manipulations (e.g., filtering, routing, or transforming the data), and output results, such as by creating a new data set on the data storage system, presenting results to the requesting device via the user interface system, or the like.

A stream data processing system may correspond to one or more computing devices that obtain data from the data sources, manipulate the data according to one or more defined sets of data stream processing instructions, and output the data to a destination, such as a data storage system. As the data from the data sources may be unbounded—that is, it has no pre-defined size or termination point—the data processed by the data processing system can be considered a data stream or streaming data. Similarly, data output by the stream data processing system can be considered a data stream or streaming data. Accordingly, the manipulations of the stream data processing system are discussed here as stream data processing. In some cases, the stream data processing system implements multiple sets of processing instructions, each associated with intaking a particular set of data (e.g., from one or more specified data sources), implementing one or more manipulations (e.g., including filtering, modifying, routing, or otherwise manipulating the data), and outputting the data (e.g., to one or more specified destinations). Each instruction set may be in some cases be referred to as a "pipeline." For example, each instruction set may be logically viewed as a pipeline through which data moves and is manipulated prior to being output.

One skilled in the art will recognize that data streams differ from defined or pre-existing data sets (referred to herein as "data sets" for brevity). For example, data streams unlike data sets typically have no fixed size or termination, but can continue (potentially indefinitely) as data is produced. Data streams are sometimes described as "data in motion," whereas data sets are sometimes described as "data at rest." Processing for data sets and data streams can differ. For example, while batch processing of a data set may apply statistical techniques (such as averages, medians, distributions, etc.) to the fixed set, stream data processing may apply such techniques to windows within the stream. Batch processing of data sets may be associated with more latency between data generation and processing than stream processing. For example, batch processing may occur periodically (e.g., every $\chi$ minutes, hours, etc.), processing a past portion of data created by a data source, with each result being delayed by up to the periodicity. Stream processing may occur continuously, enabling rapid results to be produced. Batch processing of a data set can be preferably for some tasks, such as historical analysis of existing data, while stream data processing can be preferably for other tasks, such as continuous monitoring.

The stream data processing system can output data streams to a variety of destinations. For example, where the batch search system provides for indexing of data, the stream data processing system may output a data stream to the batch search system for indexing as a data set, as described in more detail below. As another example, a user interface system may enable real-time review of data processing by the stream data processing system, and as such the stream data processing system may output a data stream to the user interface system for display on a computing device. As yet another example, the stream data processing system may output a data stream to a data storage system for storage.

A tracing data processing system may correspond to one or more computing devices that obtain data from the data sources in a hosted computing environment. The data from these data sources may include information related to the operation of software in one or more isolated execution environments (e.g., virtual machines, software containers, etc.) instantiated on a host device that shares compute resources between multiple isolated execution environments.

A machine learning data processing system may correspond to one or more computing devices that ingest shaped and/or annotated machine data and use one or more machine learning models to process the annotated machine data. In processing the annotated machine data, the machine learning data processing system may extract one or more features from the annotated machine data, identify one or more patterns in the machine data, identify deviations from the patterns and/or abnormalities from the machine generated data, etc.

With continued reference to FIG. 1, as a part of a query planning phase, as stated herein, the query coordinator 106 may create and/or generate tasks for systems, such as the systems 110, 112, and 114. The systems 110, 112, and 114 may receive tasks from the query coordinator 106, or via the inter-system interface 108, and instructions to process the tasks at a certain point in time. The tasks themselves may cover a myriad of instructions for each of the systems. For example, tasks may themselves be search queries for a particular system to execute (written in the query language of the particular system). The tasks may additionally include instructions for a particular system to obtain partial results from another runtime system and process the partial results with the particular system's own data. Moreover, the tasks may include instructions for a system to send its query results (also known as partial results since its coming from one system of possibly many systems required to satisfy a single general search query) to another system or to the query coordinator 106 (e.g., directly or via the inter-system interface 108). As such, the tasks may appear to each system as normal query processing statements that the respective runtime system understands and processes, with potentially added instructions within those tasks on where to distribute results of a query and/or what to do with those results.

The tasks that are at least created by the query coordinator 106 may include many actions and/or instructions for systems to perform and/or accomplish. Some non-limiting examples of tasks are described, however, it should be noted that such examples are not limited to the example systems described. A task may include instructions for the system 110 to retrieve data from its own data stores and process the data according to query commands written in a language (e.g., SPL) that the system 110 understands. Another task may include instructions for the system 112 to wait for partial results from the system 110 to be available in the inter-system interface 108. As another example, a task may include instructions for the system 112 to retrieve and process partial results from the inter-system interface 108. In some cases, a task may include instructions for a system, such as the system 112, to combine and process (or at least concurrently process) data retrieved from the inter-system interface 108 and from its own system (e.g., a data store of the system 112). As shown in this specific example, the system 112 (and any system connected to the query coordinator 106 via the inter-system interface 108) may have the ability to process a query involving data that it manages or stores and also data from another runtime system. Moreover, as described herein, a system that performs tasks for at least the query coordinator 106 may send its partial results to the inter-system interface 108, in some cases, under a topic associated with a search query from the client device 102. The inter-system interface 108 may then make available and/or communicate the partial results (e.g., the result of multiple runtime systems processing the data) to the query coordinator 106. Alternatively, one or more of the systems (system 110, 112, 114, etc.) may send their partial results directly to the query coordinator 106 as per task instructions.

As a non-limiting example, and as shown in FIG. 1, the client device 102 may send a query 105 to the query coordinator 106. The query coordinator 106 may receive the query 105 from the client device 102 and process it according to at least instructions within the query 105, configurations associated with the query coordinator 106, and/or setup associated with the query coordinator 106. As described herein, the query coordinator 106 may utilize the inter-system interface 108 to the process query 105 in association with at least one or more external data systems.

In some cases, the query coordinator 106 may parse the query 105 to determine which systems should receive which operations and/or commands of the query 105. In certain cases, the query coordinator 106 may parse the query 105 to identify data that should be processed, how the data should be processed, and also which systems should process the data. The query coordinator 106 may determine the location of the data and/or the system that processes (or can access) the data to be processed by identifying the commands to perform on the data, the data sources identified in the query, etc. In some cases, the query coordinator 106 may use a lookup or a configuration file to identify the location of the data and/or the system configured to access the data.

As part of processing the query, the query coordinator 106 may also identify the commands and/or operations to be performed on the data. The query coordinator 106 may determine particular systems are configured to perform these commands and/or operations. For example, the query coordinator 106 may determine that a particular command is associated with streaming data (thereby implicating a streaming data processing system) or that an abnormality_detection command is associated with a machine learning processing system.

At 117, the query coordinator 106 configures the inter-system interface 108 to receive partial results from one runtime system (e.g., systems 110, 112, 114) and make the partial results available to another runtime system (e.g., another of the systems 110, 112, 114).

In some cases, the query coordinator 106 may configure the inter-system interface 108 to operate under a pub/sub model with topics. As stated herein, the query coordinator 106 may configure the inter-system interface 108 to include one or more topics for the query 105. The partial search results from the different systems 110, 112, and 114 may be published to the same or different topics as "messages." In addition, the query coordinator 106 may configure the inter-system interface 108 to receive data from the systems 110, 112, 114, publish the received data to the one or more topics and permit the systems 110, 112, 114 to subscribe to the different topics (and retrieve the messages of the topics) associated with the query 105.

As described herein, the query coordinator 106 may also create and/or generate tasks. The tasks may include instructions for the systems 110, 112, 114 to be used in executing the query 105. The tasks for the respective systems may identify the data to process and how to process that data. For example, a first task may have instructions for the system 110 (implemented as a data stream processing system) to process streaming data and include commands and/or operations to be performed on the streaming data. The tasks may also include instructions on what to do with the results of data processed by a system. For example, a task may include instructions for the system 112 to communicate and/or publish its partial query results to the inter-system interface 108. In some cases, the query coordinator 106 may generate tasks for itself. For example, once the query coordinator 106 receives partial results from the systems 110, 112, 114, whether via the inter-system interface 108 or directly from the systems, the query coordinator 106 may finalize the partial results as a single finalized result for the client device 102. Finalizing the partial results may include formatting and/or other changes to the partial results which may make them presentable to the client device 102 in a format which the client device 102 is expecting.

As further shown in FIG. 1, the query coordinator 106 may execute the query 105. As part of executing the query, the query coordinator 106 may (concurrently or serially) send query instructions 118 to the system 110, the query instructions 122 to the system 112, and the query instructions 126 to the system 114. As described herein, the query instructions 118, 122, 126 may include the respective tasks generated by the query coordinator 106 for the different systems 110, 112, and 114.

The query instructions 118 may instruct the system 110 to process certain data and communicate the partial results 120 of processing the data to the inter-system interface 108. In some cases, the query instructions 118 may include a (first) portion of the query received by the query coordinator 106. As described herein, in some cases, the system 110 may be a streaming data processing system and the data processed as part of the query may be streaming data.

The query instructions 122 may include instructions for the system 112 to obtain the partial results 120 from the inter-system interface 108 and process the partial results 120. In some cases, the query instructions 122 may include a (second) different portion of the query received by the query coordinator 106. The second portion of the query may have some or no overlap with the first portion of the query (communicated to the system 110 as part of the query instructions 118). In some cases, the query instructions 122 may further instruct the system 112 to combine the partial results 120 with additional data accessible (or stored) by the system 112 and/or process the combined data. In certain cases, the query instructions 122 may also instruct the system 112 to communicate and/or publish its results to the inter-system interface 108 as partial results 124.

The query instructions 126 may instruct the system 114 to obtain the partial results 124 from the inter-system interface 108 and process the partial results 124 according to one or more query commands. In some cases, the query instructions 122 may include a (third) different portion of the query received by the query coordinator 106. The third portion of the query may have some or no overlap with the first portion and/or second portion of the query (communicated to the systems 110, 112 as part of the query instructions 118, 122, respectively). In some cases, the query instructions 126 may further instruct the system 114 to combine the partial results 124 with additional data accessible (or stored) by the system 114 and/or process the combined data. In certain cases, the query instructions 126 may also instruct the system 114 to communicate and/or publish its results to the inter-system interface 108 as partial results 128.

As described herein, the query coordinator 106 may also generate one or more instructions for itself. These instructions may cause the query coordinator 106 to obtain the partial results 128 from the inter-system interface 108, process the partial results 128 according to one or more query commands, and communicate the query results 132 to the client device 102.

In some cases, the query coordinator 106 may obtain and/or process the partial results 120, partial results 124, and partial results 128 from the inter-system interface 108. For example, as described herein, in some cases, the inter-system interface 108 may be configured to retain the partial results 120, partial results 124, and partial results 128 to enable the query coordinator 106 to retrieve them. In certain cases, the inter-system interface 108 is configured to remove or delete the partial results 120, partial results 124, and/or partial results 128 once they are retrieved by the next downstream system (or once the query results 132 are sent to the client device 102). By retrieving the partial results 120, partial results 124, and/or partial results 128, the query coordinator 106 may enable troubleshooting and/or deeper analysis of the query. For example, by analyzing the partial results 120, a user may identify issues with the system 110 and/or with the query 105.

It should be understood that the disclosed techniques can extend the search, extraction, execution, and analytics capabilities of a search query system to use multiple external or runtime data systems to process data (sequentially). For example, the query coordinator 106 may send query instructions to the different external systems to perform parts of a query, send the results of processing the part of the query (e.g., the partial results) to an inter-system interface, and enable a downstream external system (in terms of how the query is processed) to retrieve the partial results generated by the upstream system (in terms of how the query is processed), perform additional processing, and return the updated partial results to the inter-system interface for another system or the query coordinator to retrieve. Although the example primarily references the use of different runtime systems, it will be understood that the description herein may also be used to facilitate the sequential processing of data using multiple internal or external systems from the same runtime (e.g., using multiple batch search query systems, multiple data stream processing systems, and/or multiple tracing data systems).

In some cases, to access or process data from a particular data source (or another component) as part of executing a query, a runtime system may use (or require) system credentials associated with the data source. For example, to access a data store of a shared storage system, the shared storage system may require credentials from a runtime system before allowing the runtime system to access the data store. Moreover, before a runtime system or other component accesses a particular data source there may be multiple communications between different components and the system credential for the data source may be shared with the various components. For example, the query coordinator 106 may communicate a copy of the query instructions to each runtime system involved in the query (e.g., with indications of which runtime system is to process which query instructions). In some such cases, each runtime system may receive a copy of the system credential of a particular data source even if only one of the runtime systems will be accessing the particular data source. Similarly, multiple (distributed) components within a particular runtime system may receive a copy of a credential for a particular data source. The more components that receive a copy of system credentials for a particular component or system, the greater the likelihood that a breach will result in the system credential being compromised by a bad actor.

To address this issue, the query coordinator 106 (or another component) may store credential information to access one or more runtime systems. Instead of providing different systems with copies of a particular credential, the query coordinator 106 may provide the systems with a reference to the stored system credentials (e.g., via a universal resource identifier or "URI"). In this way, copies of the credential are not communicated to multiple systems that will not be accessing the component.

When a particular system (or component of a system) is ready to access the particular component (e.g., a data store), it can use the reference to retrieve the credential (e.g., communicate with the query coordinator 106 to determine the credential). For example, a runtime system may identify the location of a version of the credential by parsing a URI for a path location to the credential. The runtime system may use the path location to access the location where the credential is stored. In some cases, the query coordinator 106 (or other component) may validate the requesting runtime system (or component thereof) prior to granting access to the credential.

Figure 2:
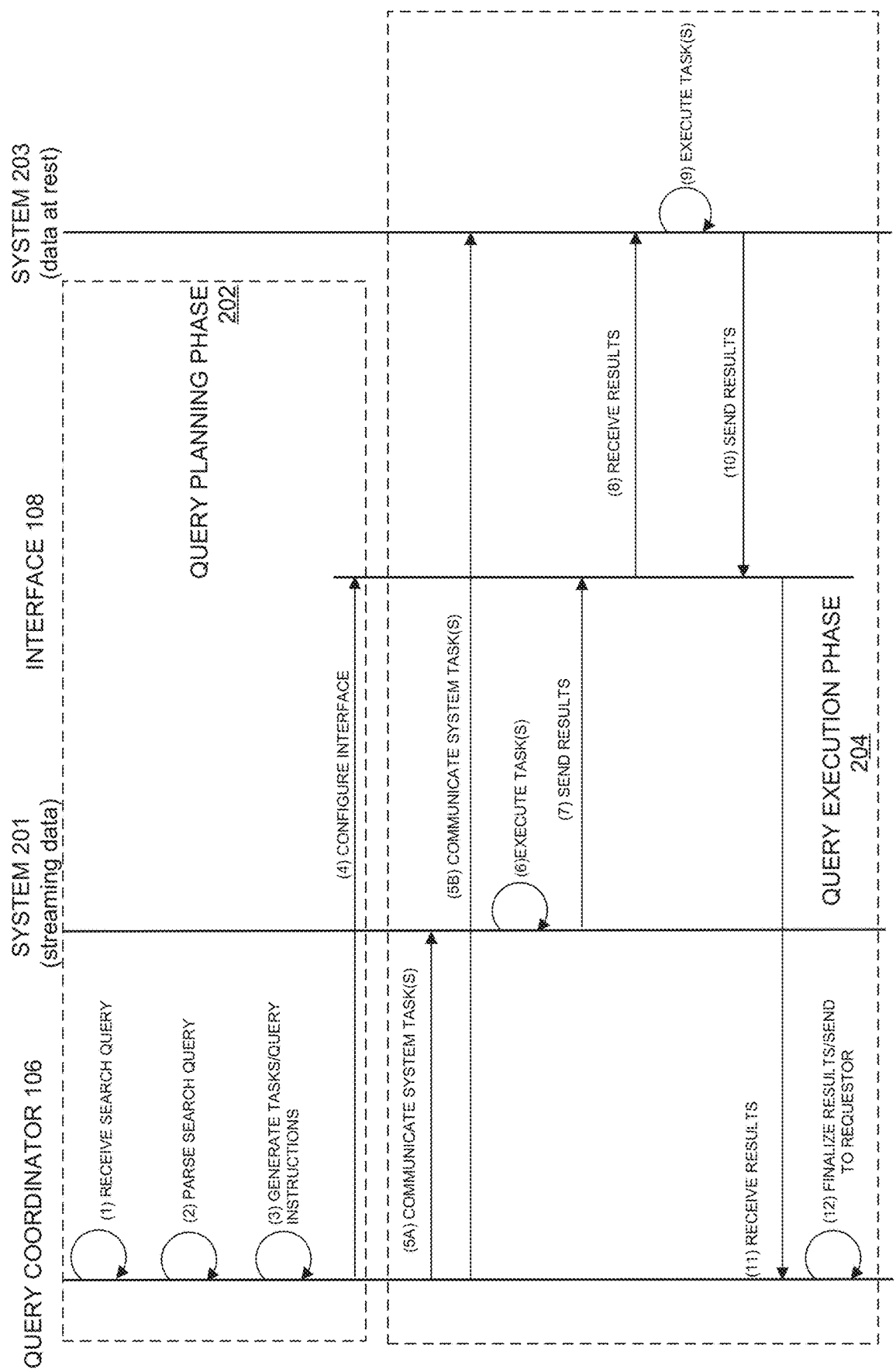
FIG. 2 is a data flow diagram illustrating an embodiment of communications between various components to process a query involving multiple systems.

FIG. 2 is a data flow diagram illustrating an example of communications between various components sequentially processing data using different runtime systems 201, 203, a query coordinator 106 and an inter-system interface 108. Although FIG. 2 references different runtime systems, it will be understood that the description herein may also be used to facilitate the sequential processing of data using multiple internal or external systems from the same runtime (e.g., using multiple batch search query systems, multiple data stream processing systems, and/or multiple tracing data systems).

As described above, the query coordinator 106 may receive a (single) search query from the client device 102. The client device 102 may be agnostic to the number of external systems involved in providing results to the single search query and may only seek the results from the query coordinator 106. As such, the query coordinator 106 may enable the abstraction of the inter-system communications and processing to execute the query.

The processing and execution of the query may involve two general phases: a query planning phase 202 and a query execution phase 204. The query planning phase 202 may include various steps or internal processes of the query coordinator 106 as it determines what data is to be retrieved/processed, identifies the location of the data to be retrieved/processed, determines the systems that will retrieve and process the data, and determines the commands for the different systems to execute the query, etc. As such, during the query planning phase 202, the query coordinator 106 may generate tasks or instructions for itself and other systems that will be involved in the execution of the query.

The query execution phase 204 may include various steps or communications between the query coordinator 106 and the systems or components that will be used to retrieve the data to be processed and process the data. As part of the query execution phase 204, the query coordinator 106 may distribute tasks and/or instructions to different systems and/or components (including itself), and the relevant components may execute the received tasks.

Although illustrated in a particular order, it will be understood that in some cases one or more portions of the query planning phase 202 and/or query execution phase 204 may be performed in a different order and/or performed concurrently.

At (1), the query coordinator 106 receives a search query from the client device 102. As stated above, the search query may have been sent and/or communicated by a requestor (e.g., client device 102) to the query coordinator 106. Moreover, the client device 102 may be agnostic as to how many external systems are required to provide the results to the search query. As such, the requestor may send the search query in one language or communication protocol and rely on query coordinator 106 to create different queries to different external systems in each of the external systems' respective languages and/or communication protocols.

At (2), the query coordinator 106 parses the search query. As described herein, as part of parsing the query, the query coordinator 106 can determine that the search query to be executed is a multi-system query, or involves data managed, processed, and/or stored by different runtime systems, such as a streaming data system that processes streaming data and a batch search system that processes data in batches. In some cases, the query coordinator 106 can determine that the search query to be executed is a multi-system query based on commands, function calls, or terms in the search query that map to different runtime systems. For example, the query coordinator 106 may have certain search query operations and/or commands mapped to runtime system 201, while other search query operations and/or commands may be mapped to runtime system 203. For example, the query coordinator 106 may identify the command "select streaming data" as related to a streaming external data system and map the command to be distributed to external system 201, which may be identified as a streaming system (e.g., by at least evaluating mapping stored in the configurations 116). As another example, the query coordinator 106 may identify the command "select at rest data" as related to a system storing at rest data and map the command to be distributed to external system 203, which may be identified as a batch search system. However, it will be understood that a variety of methods can be used to indicate that a search query is a multi-system query. In some cases, the search query can include details of a subquery for either system 201 or system 203. For example, the search query can include a search string for the subquery, access information to access the system 201 or system 203, and/or other relevant information to enable the query coordinator 106 to generate a subquery for either system 201 or system 203.

At (3), the query coordinator 106 generates tasks and/or query instructions based on operations and/or commands within the search query received from the requestor. As stated above, the query coordinator 106 may access configurations 116 which map operations and/or commands to certain systems such that when query coordinator 106 identifies those operations and/or commands, it knows to associate those operations or commands with a certain system. Moreover, because the search query may be in a single language, the query coordinator 106 may convert or translate operations or commands from the language used in the search query to operations or commands in a different language for different systems. As an example, the command or operation "select1" may be mapped to a select statement of system 201 in one query language, whereas "select2" may be mapped to a select statement of system 203 in a different query language.

Using the operations and/or commands from the search query, the query coordinator 106 may generate query instructions for system 201 and system 203. As stated above, the query coordinator 106 may know how to segregate commands and/or operations of system 201 and system 203. Therefore, the query coordinator 106 may intelligently determine what partial results will be generated by system 201 and generate query instructions for system 201 (e.g., in system 201's processing language). Similarly, the query coordinator 106 may intelligently determine what partial results will be generated by system 203 and generate query instructions for system 203 (e.g., in system 203's language). Moreover, the query instructions (or tasks) generated by the query coordinator 106 may provide instructions to systems 201 and 203 to retrieve data to process and/or dictate how a query is run in that system. For example, the query coordinator 106 may instruct system 203 to retrieve system 201's partial results from the inter-system interface 108 and use those partial results in system 203's query processing.

At (4), the query coordinator 106 configures the inter-system interface 108 to: receive partial results from the system 201, enable the system 203 to retrieve the partial results from the system 201, receive updated partial results from the system 203, and enable the query coordinator 106 to retrieve the updated partial results from the system 203. In certain cases, the query coordinator 106 may configure the inter-system interface 108 in a pub-sub model identifying the system 201, the system 203, and/or the query coordinator 106 as publishers and/or subscribers to different topics as the case may be.

At (5A) and (5B), the query coordinator 106 distributes the generated tasks or query instruction to the respective systems 201 and 203. As stated above, the tasks may include query commands that were translated from one language to another language. For example, in FIG. 2, the system 201 is a streaming data processing system that processes streaming data. Therefore, the query coordinator 106 may generate tasks or include commands or query instructions specific to streaming data, and communicate those tasks to the system 201 at (5A). As another non-limiting example, in the illustrated example, the system 201 is a batch search system. Therefore, the query coordinator 106 may generate tasks or include commands or query instructions specific to streaming data, and communicate those tasks to the system 203 at (5B).

At (6), the system 201 executes the tasks (query instructions) received from the query coordinator 106. The tasks may include retrieving data and/or processing it according to one or more query commands. As described herein, the tasks or query commands may be in a query language particular to the system 201 (and translated by the query coordinator 106 from a different query language).

At (7), the system 201 sends the results of processing the tasks (e.g., results of processing data according to one or more commands in the tasks) or partial results to the inter-system interface 108. In some cases, the query instructions received at (5A) may include an instruction to send the partial results to the inter-system interface 108. As described herein, in some cases, in communicating and/or sending the partial results, the system 201 may "publish" the partial results to a particular topic associated with the search query (and/or associated specifically with communications between the system 201 and the system 203).

At (8), the system 203 retrieves the partial results (generated by the system 201) from the inter-system interface 108. As described herein, the tasks or query instructions sent to the system 203 at (5B) may include instructions to retrieve the partial results from the inter-system interface 108. Accordingly, based on the received query instructions, the system 203 can retrieve the partial results from the inter-system interface 108.

At (9), the system 203 executes the tasks (query instructions) sent to it by query coordinator 106 at (5B). As described herein, the system 203 may, according to the query instructions process the partial results from system 201 and/or process data retrieved from its own system. In the illustrated example, as the system 203 is shown as a batch search system, the query instructions may include query commands to retrieve and process data at rest alone or in combination with the partial results generated by a streaming data processing system (e.g., system 201).

At (10), the system 203 sends the results of processing its tasks (e.g., results of processing data according to the one or more commands in the tasks) or partial results to the inter-system interface 108. In some cases, the query instructions received at (5B) may include an instruction to send the partial results to the inter-system interface 108. As described herein, in some cases, in communicating and/or sending the partial results, the system 203 may "publish" the partial results to a particular topic associated with the search query (and/or associated specifically with communications between the system 203 and the query coordinator 106).

At (11), the query coordinator 106 retrieves the partial results (generated by the system 203) from the inter-system interface 108. As described herein, the tasks or query instructions generated by the query coordinator 106 may include instructions to retrieve the partial results generated by the system 203 from the inter-system interface 108. Accordingly, based on the generated query instructions, the query coordinator 106 can retrieve the partial results from the inter-system interface 108. In certain cases, the query coordinator 106 may be configured to also retrieve the partial results generated by system 201 for debugging or another analysis.

At (12), the query coordinator 106 processes (or finalizes) the partial results pulled from the inter-system interface 108. Further processing and/or finalizing the partial results may include formatting them into a presentable and readable format which the client device 102 can understand.

It will be understood that the multi-system data flow can include fewer or more steps. For example, in some cases, the query may include processing by three or more different runtime systems and/or different systems in the same runtime. Moreover, it will be understood that the various functions described can be performed concurrently or in any order. For example, the query coordinator 106 may generate and communicate the query instructions to system 201 before, after, or concurrently with the query instructions for system 203.

As described herein, the query coordinator may use multiple runtimes to sequentially execute different portions of a query (e.g., one runtime to retrieve and process data and a machine learning runtime to further process or transform the data). As a non-limiting example, consider the scenario in which the query coordinator 106 receives the following query from a client device 102: "$output=|from main|head limit=10|fit 'DensityFunction' bytes split_by=[field1, field2] into model." Based on the query, the query coordinator 106 may send a (first) portion of the query (e.g., "from main-|head limit=10") to a batch search runtime system and receive results from such runtime (e.g., receive the results itself or the results may be communicated to the interface 108). The query coordinator 106 may take those results and send them to a machine learning runtime (e.g., itself or by sending an instruction to the machine learning runtime to retrieve the results from the interface 108) along with another (second portion) of the query such that a machine learning model processes the results from the batch search runtime system according to the command "fit 'DensityFunction' bytes split_by=[field1, field2]." Some or all of the results from the machine learning runtime may be communicated to the query coordinator 106 or another runtime system (e.g., directly or via the inter-system interface 108).

As yet another non-limiting example, the query coordinator 106 may receive the following query from the client device 102: "$output=|from supermarket|apply example_soda_supermarket show_density=True sample=True." The query coordinator 106 may send a (first) portion of the receive query (e.g., "from supermarket") to a batch search runtime system and receive results from such runtime system (e.g., receive the results itself or the results may be communicated to the interface 108). The query coordinator 106 may cause the results received from the batch search runtime system to be communicated to a machine learning runtime (e.g., directly or via the inter-system interface 108). The query coordinator 106 may also communicate another (second) portion of the query to machine learning runtime (e.g., "apply example_soda_supermarket show_density=True sample=True"). The machine learning runtime may process the results from the batch search runtime system according to the received second portion of the query. Some or all of the results from the machine learning runtime may be communicated to the query coordinator 106 or another runtime system (e.g., directly or via the inter-system interface 108).

In some cases, the query coordinator 106 may concurrently send tasks to multiple runtime systems (e.g., system 201, system 203, etc.) for parallel processing, aggregate the results from each runtime system as a union dataset, and perform additional processing on the union dataset. For example, the query coordinator 106 may receive the following query from the client device 102: "$multi_runtime_search=FROM [main_index, bucket] |SEARCH "error"|stats count( )" Based on this example query, the query coordinator 106 may concurrently instruct a first runtime system with a source "main_index" and a second runtime system with a source "bucket") to retrieve data (in parallel).

In response, each runtime system may concurrently or asynchronously return its results to the query coordinator 106 (e.g., directly to the query coordinator 106 or via the inter-system interface 108). For example, the first runtime system and the second runtime system may return results concurrently (e.g., without sequential dependence on one another). As such, the results from the first runtime system may be a first dataset and the results from the second runtime system may be a second dataset.

The query coordinator 106 may combine the first and second datasets to form a union dataset. The query coordinator 106 may perform one or more tasks or a second portion of the query (e.g., "SEARCH "error"|stats count( )") on the union dataset. For example, the query coordinator 106 may search for the "error" string within the union dataset and then conduct a stats count( ) aggregation of the search. The results of the query may be communicated and/or published to a client device 102 of the query or even published to the inter-system interface 108 for retrieval by other systems or users, and the like.

Figure 3:
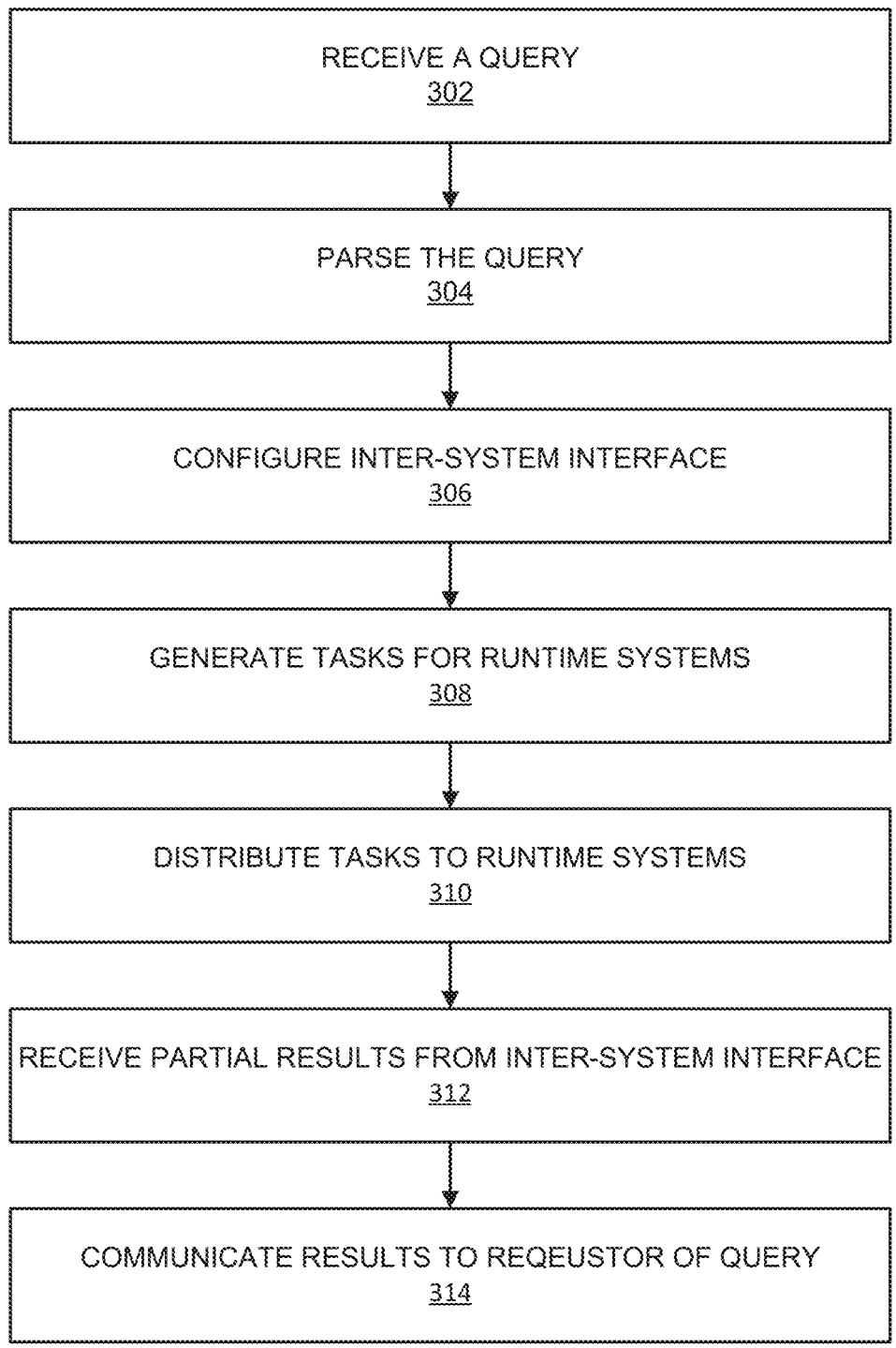
FIG. 3 is a flow diagram illustrating an embodiment of a routine implemented by a query coordinator to process a search query.

FIG. 3 is a flow diagram illustrative of an example of a routine 300 implemented by the query coordinator 106 to execute a search query using multiple (runtime) systems. Although described as being implemented by the query coordinator 106, it will be understood that one or more elements outlined for routine 300 can be implemented by one or more computing devices/components that are associated with the query coordinator 106, such as the inter-system interface 108. Thus, the following illustrative embodiment should not be construed as limiting. The example routine 300 can be implemented, for example, by a computing device that comprises a processor and a non-transitory computer-readable medium. The non-transitory computer readable medium can be storing instructions that, when executed by the processor, can cause the processor to perform the operations of the illustrated routine 300. Alternatively, or additionally, the routine 300 can be implemented using a non-transitory computer-readable medium storing instructions that, when executed by one or more processors, cause the one or more processors to perform the operations of the process 300 of FIG. 3.

At block 302, the query coordinator 106 receives a search query. As described herein, the query coordinator 106 may receive the search query from the client device 102. In receiving the search query, the query coordinator 106 may perform pre-processing on the search query to confirm that the client device 102 has appropriate authorizations to request the query be executed. The query coordinator 106 may also perform a semantic or syntax review of the query to verify that the query is a valid query.

At block 304, the query coordinator 106 parses the query. As part of processing the query, the query coordinator 106 may identify sets of data to be processed, operations to be performed on the sets of data, and runtime systems to execute the commands (or portions of the query). As described herein, in some cases, the query coordinator 106 may identify the sets of data by parsing the search query to identify dataset identifiers, identify the operations to perform on the datasets by parsing the search query to identify query commands, and identify the runtime systems associated with the search query by identifying the runtime systems that include, control access to, or store the sets of data to be processed, and/or the runtime systems that are configured to perform the operations corresponding to the query commands.

The sets of data may include data accessible via, stored on, or managed by runtime systems, partial results received from runtime systems, and/or any set of data which is involved with processing the search query. For example, the query coordinator 106 may identify sets of data as data stored in more than one system, such as a first data set as streaming data processed by a streaming system, and a second data set as at rest data on a batch search system.

In some cases, the sets of data may correspond to different types of data, such as streaming data, data at rest, trace data, and/or the results of processing any one or any combination of the aforementioned types of data. In certain cases, some or all of the sets of data may be associated with one of the runtime systems. For example, one set of data may include streaming data associated with a streaming data processing system, another set of data may include data at rest associated with a batch search system, another set of data may include trace data at rest associated with a tracing data processing system, etc.

The operations may include commands that runtime systems may perform to process a part of the search query. For example, the query coordinator 106 may identify operations for a streaming system in some parts of the search query and then identify operations for a batch search system in other parts of the search query.

The runtime systems may include systems that store and/or process different types of data or data in different states. As described herein, different runtime systems may store and process different types of data such as streaming data, at rest data, audio data, machine learning applied data, etc. As such, the query coordinator 106 may parse the search query and identify the different runtime systems that will be used to process the query.

At block 306, the query coordinator 106 configures an interface, such as the inter-system interface 108, for the different runtime systems. In some cases, the configured interface enables the communication of partial results between different runtime systems and/or the query coordinator 106. In some cases, the query coordinator 106 may configure the interface by implementing a pub-sub model that enables the runtime systems to publish messages to one or more topics and/or subscribe to the topics to receive messages. As described herein, the query coordinator 106 may configure the interface to include one or more topics for the search query such that the communication of partial results between runtime systems occurs on one or multiple topics.

At block 308, the query coordinator 106 generates tasks for at least one of the runtime systems. In certain cases, the query coordinator 106 generates task(s) for some or all of the runtime systems (and/or for itself). For example, based on a first query command, the query coordinator 106 may generate a first task for a first runtime system and based on a second query command, the query coordinator 106 may generate a second task for a second runtime system to process data, etc.

In some cases, the tasks may include query commands or instructions for the runtime system (or the query coordinator 106). As described above, the query commands may be in a query language that is different from the query language of the search query received by the query coordinator 106. In some cases, the commands or instructions may include instructions to process a (first) set of data to generate partial results (a second set of data), communicate (e.g., publish) the partial results to the inter-system interface 108, retrieve partial results from a previous runtime system from the inter-system interface 108, process the retrieved partial results (alone or in combination with additional data from the system (e.g., a third set of data)) to generate updated partial results (a fourth set of data), communicate the updated partial results to the inter-system interface 108, etc.

As described herein, in certain cases, the query coordinator 106 may generate one or more query instructions for itself to retrieve partial results from one or more of the runtime systems, process the retrieved results to generate query results (e.g., a fifth set of data), and communicate the results to a client device.

At block 310, the query coordinator 106 distributes the generated tasks to one or more runtime systems. As described herein, a task may include one or more instructions for a runtime system to process a set of data, communicate partial results to the inter-system interface 108, retrieve partial results from the inter-system interface 108, process retrieved partial results from the inter-system interface 108 (alone or in combination with additional data) to generate second partial results, and/or communicate the second partial results to the inter-system interface 108.

Accordingly, when a particular runtime system receives its tasks from the query coordinator 106, it may perform query processing without receiving data from the inter-system interface 108 and/or wait for another system to send their partial results to the inter-system interface 108 and pull those partial query results for processing. If a system uses partial query results from another runtime system, such system may utilize such partial results as input into its own query processing.

At block 312, the query coordinator 106 receives partial results (from at least one of the runtime systems) from the inter-system interface 108. After receiving the partial results from the inter-system interface 108, the query coordinator 106 may further process the partial results by modifying and/or formatting them into one finalized result that is deliverable to the initial requestor (e.g., the client device 102) of the search query.

At block 314, the query coordinator 106 communicates the results of the search query to the requestor. As described herein, the results may be a finalized version of all the partial results received from the externals systems identified at block 304. The finalized results may be an aggregation and/or modified version of the partial results.

Data Intake and Query System

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (SaaS) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 4A:
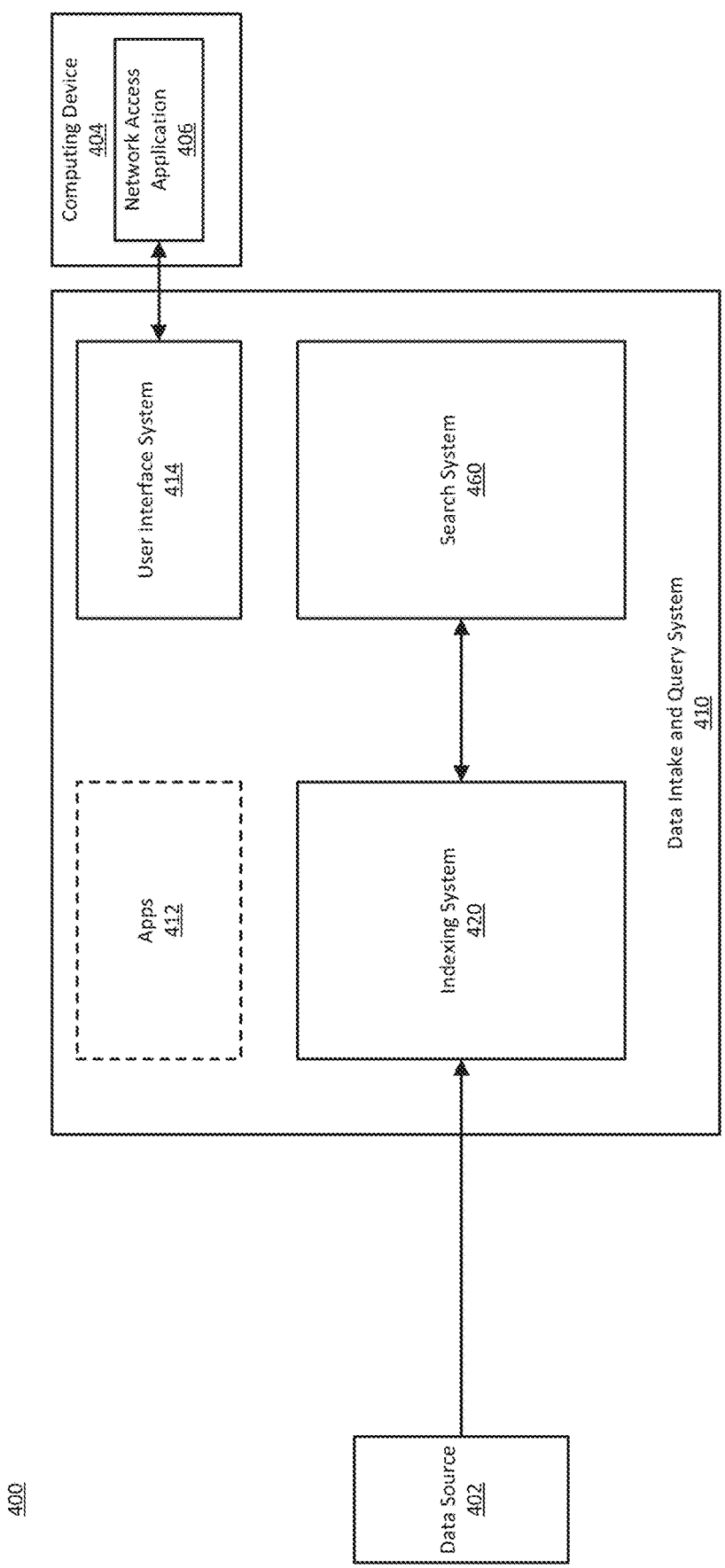
FIG. 4A is a block diagram illustrating an example computing environment.

FIG. 4A is a block diagram illustrating an example computing environment 400 that includes a data intake and query system 410. The data intake and query system 410 obtains data from a data source 402 in the computing environment 400, and ingests the data using an indexing system 420. A search system 460 of the data intake and query system 410 enables users to navigate the indexed data. Though drawn with separate boxes in FIG. 4A, in some implementations the indexing system 420 and the search system 460 can have overlapping components. A computing device 404, running a network access application 406, can communicate with the data intake and query system 410 through a user interface system 414 of the data intake and query system 410. Using the computing device 404, a user can perform various operations with respect to the data intake and query system 410, such as administration of the data intake and query system 410, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 410 can further optionally include apps 412 that extend the search, analytics, and/or visualization capabilities of the data intake and query system 410.

The data intake and query system 410 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 410 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 410 can be executed on a single computing device, or execution of the program code can be distributed over multiple computing devices. For example, the program code can include instructions for both indexing and search components (which may be part of the indexing system 420 and/or the search system 460, respectively), which can be executed on a computing device that also provides the data source 402. As another example, the program code can be executed on one computing device, where execution of the program code provides both indexing and search components, while another copy of the program code executes on a second computing device that provides the data source 402. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 402 of the computing environment 400 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 402 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 420 obtains machine date from the data source 402 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 420 does not require prior knowledge of the structure of incoming data (e.g., the indexing system 420 does not need to be provided with a schema describing the data). Additionally, the indexing system 420 retains a copy of the data as it was received by the indexing system 420 such that the original data is always available for searching (e.g., no data is discarded, though, in some examples, the indexing system 420 can be configured to do so).

The search system 460 searches the data stored by the indexing 420 system. As discussed in greater detail below, the search system 460 enables users associated with the computing environment 400 (and possibly also other users) to navigate the data, generate reports, and visualize search results in "dashboards" output using a graphical interface. Using the facilities of the search system 460, users can obtain insights about the data, such as retrieving events from an index, calculating metrics, searching for specific conditions within a rolling time window, identifying patterns in the data, and predicting future trends, among other examples. To achieve greater efficiency, the search system 460 can apply map-reduce methods to parallelize searching of large volumes of data. Additionally, because the original data is available, the search system 460 can apply a schema to the data at search time. This allows different structures to be applied to the same data, or for the structure to be modified if or when the content of the data changes. Application of a schema at search time may be referred to herein as a late-binding schema technique.

The user interface system 414 provides mechanisms through which users associated with the computing environment 400 (and possibly others) can interact with the data intake and query system 410. These interactions can include configuration, administration, and management of the indexing system 420, initiation and/or scheduling of queries that are to be processed by the search system 460, receipt or reporting of search results, and/or visualization of search results. The user interface system 414 can include, for example, facilities to provide a command line interface or a web-based interface.

Users can access the user interface system 414 using a computing device 404 that communicates with data intake and query system 410, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 400. For example, a person can log in as a particular user and, using the user's digital information, can access the data intake and query system 410. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 404 can provide a human-machine interface through which a person can have a digital presence in the computing environment 400 in the form of a user. The computing device 404 is an electronic device having one or more processors and a memory capable of storing instructions for execution by the one or more processors. The computing device 404 can further include input/output (I/O) hardware and a network interface. Applications executed by the computing device 404 can include a network access application 406, such as a web browser, which can use a network interface of the client computing device 404 to communicate, over a network, with the user interface system 414 of the data intake and query system 410. The user interface system 414 can use the network access application 406 to generate user interfaces that enable a user to interact with the data intake and query system 410. A web browser is one example of a network access application. A shell tool can also be used as a network access application. In some examples, the data intake and query system 410 is an application executing on the computing device 406. In such examples, the network access application 406 can access the user interface system 414 without going over a network.

The data intake and query system 410 can optionally include apps 412. An app of the data intake and query system 410 is a collection of configurations, knowledge objects (a user-defined entity that enriches the data in the data intake and query system 410), views, and dashboards that may provide additional functionality, different techniques for searching the data, and/or additional insights into the data. The data intake and query system 410 can execute multiple applications simultaneously. Example applications include an information technology service intelligence application, which can monitor and analyze the performance and behavior of the computing environment 400, and an enterprise security application, which can include content and searches to assist security analysts in diagnosing and acting on anomalous or malicious behavior in the computing environment 400.

Though FIG. 4A illustrates only one data source, in practical implementations, the computing environment 400 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity.

In an entirely on-prem implementation of the computing environment 400, the data intake and query system 410 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 400 can include on-prem and cloud-based computing resources, or only cloud-based resources. For example, an entity may have on-prem computing devices and a private cloud. In this example, the entity operates the data intake and query system 410 and can choose to execute the data intake and query system 410 on an on-prem computing device or in the cloud. In another example, a provider entity operates the data intake and query system 410 in a public cloud and provides the functionality of the data intake and query system 410 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 410. In some implementations, the entity providing the data intake and query system 410 is itself subscribing to the cloud services of a cloud service provider. As an example, a first entity provides computing resources under a public cloud service model, a second entity subscribes to the cloud services of the first provider entity and uses the cloud computing resources to operate the data intake and query system 410, and a third entity can subscribe to the services of the second provider entity in order to use the functionality of the data intake and query system 410. In this example, the data sources are associated with the third entity, users accessing the data intake and query system 410 are associated with the third entity, and the analytics and insights provided by the data intake and query system 410 are for purposes of the third entity's operations.

Figure 4B:
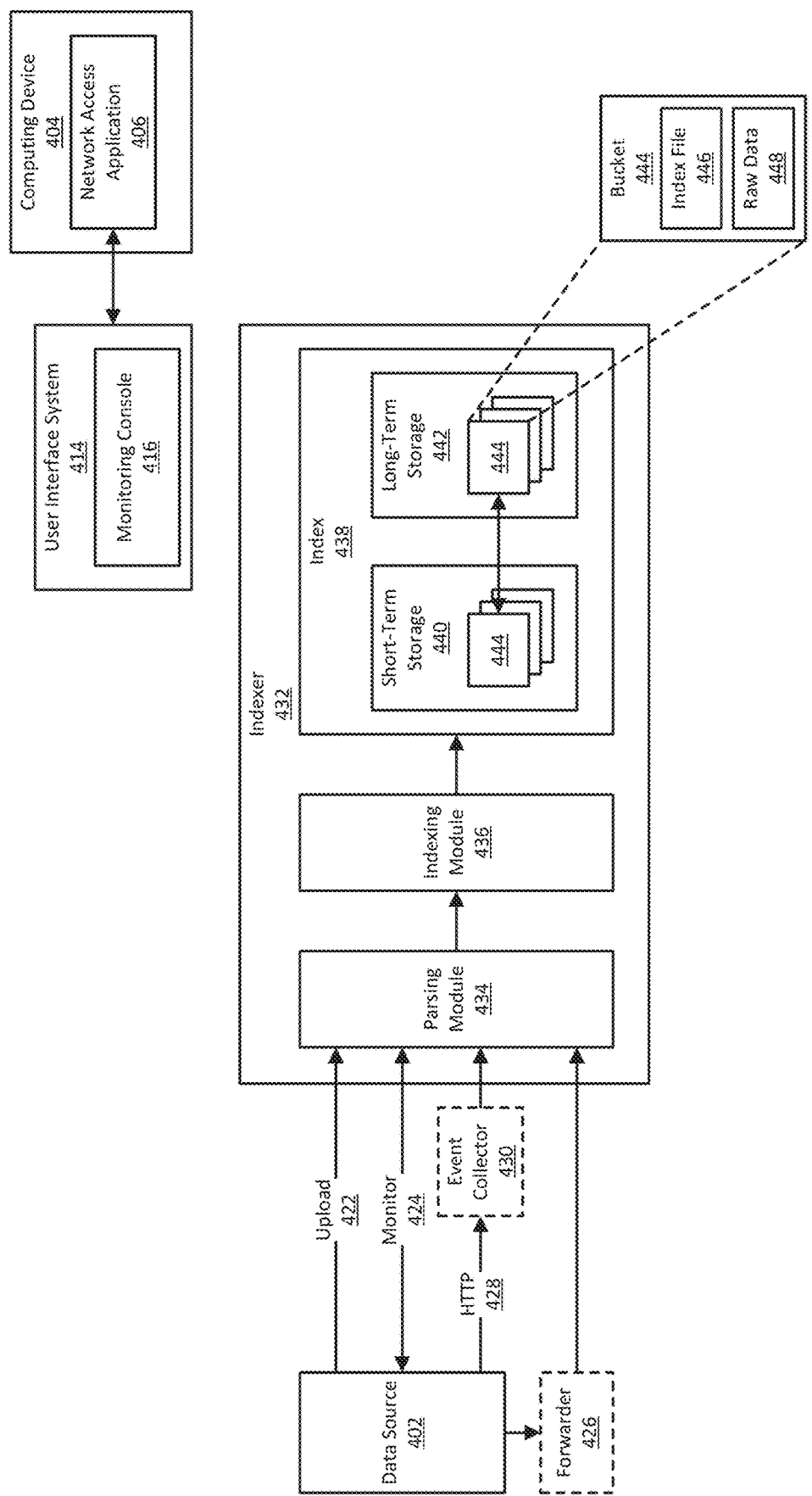
FIG. 4B is a block diagram illustrating an example of an indexing system of a data intake and query system.

FIG. 4B is a block diagram illustrating in greater detail an example of an indexing system 420 of a data intake and query system, such as the data intake and query system 410 of FIG. 4. The indexing system 420 of FIG. 4 uses various methods to obtain machine data from a data source 402 and stores the data in an index 438 of an indexer 432. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 420 enables the data intake and query system to obtain the machine data produced by the data source 402 and to store the data for searching and retrieval.

Users can administer the operations of the indexing system 420 using a computing device 404 that can access the indexing system 420 through a user interface system 414 of the data intake and query system. For example, the computing device 404 can be executing a network access application 406, such as a web browser or a terminal, through which a user can access a monitoring console 416 provided by the user interface system 414. The monitoring console 416 can enable operations such as: identifying the data source 402 for data ingestion; configuring the indexer 432 to index the data from the data source 432; configuring a data ingestion method; configuring, deploying, and managing clusters of indexers; and viewing the topology and performance of a deployment of the data intake and query system, among other operations. The operations performed by the indexing system 420 may be referred to as "index time" operations, which are distinct from "search time" operations that are discussed further below.

The indexer 432, which may be referred to herein as a data indexing component, coordinates and performs most of the index time operations. The indexer 432 can be implemented using program code that can be executed on a computing device. The program code for the indexer 432 can be stored on a non-transitory computer-readable medium (e.g., a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 432. In some implementations, the indexer 432 executes on the computing device 404 through which a user can access the indexing system 420. In some implementations, the indexer 432 executes on a different computing device than the illustrated computing device 404.

The indexer 432 may be executing on the computing device that also provides the data source 402 or may be executing on a different computing device. In implementations wherein the indexer 432 is on the same computing device as the data source 402, the data produced by the data source 402 may be referred to as "local data." In other implementations the data source 402 is a component of a first computing device and the indexer 432 executes on a second computing device that is different from the first computing device. In these implementations, the data produced by the data source 402 may be referred to as "remote data." In some implementations, the first computing device is "on-prem" and in some implementations the first computing device is "in the cloud." In some implementations, the indexer 432 executes on a computing device in the cloud and the operations of the indexer 432 are provided as a service to entities that subscribe to the services provided by the data intake and query system.

For a given data produced by the data source 402, the indexing system 420 can be configured to use one of several methods to ingest the data into the indexer 432. These methods include upload 422, monitor 424, using a forwarder 426, or using Hypertext Transfer Protocol (HTTP 428) and an event collector 430. These and other methods for data ingestion may be referred to as "getting data in" (GDI) methods.

Using the upload 422 method, a user can specify a file for uploading into the indexer 432. For example, the monitoring console 416 can include commands or an interface through which the user can specify where the file is located (e.g., on which computing device and/or in which directory of a file system) and the name of the file. The file may be located at the data source 402 or maybe on the computing device where the indexer 432 is executing. Once uploading is initiated, the indexer 432 processes the file, as discussed further below. Uploading is a manual process and occurs when instigated by a user. For automated data ingestion, the other ingestion methods are used.

The monitor 424 method enables the indexing system 420 to monitor the data source 402 and continuously or periodically obtain data produced by the data source 402 for ingestion by the indexer 432. For example, using the monitoring console 416, a user can specify a file or directory for monitoring. In this example, the indexing system 420 can execute a monitoring process that detects whenever the file or directory is modified and causes the file or directory contents to be sent to the indexer 432. As another example, a user can specify a network port for monitoring. In this example, a monitoring process can capture data received at or transmitting from the network port and cause the data to be sent to the indexer 432. In various examples, monitoring can also be configured for data sources such as operating system event logs, performance data generated by an operating system, operating system registries, operating system directory services, and other data sources.

Monitoring is available when the data source 402 is local to the indexer 432 (e.g., the data source 402 is on the computing device where the indexer 432 is executing). Other data ingestion methods, including forwarding and the event collector 430, can be used for either local or remote data sources.

A forwarder 426, which may be referred to herein as a data forwarding component, is a software process that sends data from the data source 402 to the indexer 432. The forwarder 426 can be implemented using program code that can be executed on the computer device that provides the data source 402. A user launches the program code for the forwarder 426 on the computing device that provides the data source 402. The user can further configure the forwarder 426, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 426 can provide various capabilities. For example, the forwarder 426 can send the data unprocessed or can perform minimal processing on the data before sending the data to the indexer 432. Minimal processing can include, for example, adding metadata tags to the data to identify a source, source type, and/or host, among other information, dividing the data into blocks, and/or applying a timestamp to the data. In some implementations, the forwarder 426 can break the data into individual events (event generation is discussed further below) and send the events to a receiver. Other operations that the forwarder 426 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 430 provides an alternate method for obtaining data from the data source 402. The event collector 430 enables data and application events to be sent to the indexer 432 using HTTP 428. The event collector 430 can be implemented using program code that can be executing on a computing device. The program code may be a component of the data intake and query system or can be a standalone component that can be executed independently of the data intake and query system and operates in cooperation with the data intake and query system.

To use the event collector 430, a user can, for example using the monitoring console 416 or a similar interface provided by the user interface system 414, enable the event collector 430 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 402 as an alternative method to using a username and password for authentication.

To send data to the event collector 430, the data source 402 is supplied with a token and can then send HTTP 428 requests to the event collector 430. To send HTTP 428 requests, the data source 402 can be configured to use an HTTP client and/or to use logging libraries such as those supplied by Java, JavaScript, and .NET libraries. An HTTP client enables the data source 402 to send data to the event collector 430 by supplying the data, and a Uniform Resource Identifier (URI) for the event collector 430 to the HTTP client. The HTTP client then handles establishing a connection with the event collector 430, transmitting a request containing the data, closing the connection, and receiving an acknowledgment if the event collector 430 sends one. Logging libraries enable HTTP 428 requests to the event collector 430 to be generated directly by the data source. For example, an application can include or link a logging library, and through functionality provided by the logging library manage establishing a connection with the event collector 430, transmitting a request, and receiving an acknowledgement.

An HTTP 428 request to the event collector 430 can contain a token, a channel identifier, event metadata, and/or event data. The token authenticates the request with the event collector 430. The channel identifier, if available in the indexing system 420, enables the event collector 430 to segregate and keep separate data from different data sources. The event metadata can include one or more key-value pairs that describe the data source 402 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 430 extracts events from HTTP 428 requests and sends the events to the indexer 432. The event collector 430 can further be configured to send events to one or more indexers. Extracting the events can include associating any metadata in a request with the event or events included in the request. In these implementations, event generation by the indexer 432 (discussed further below) is bypassed, and the indexer 432 moves the events directly to indexing. In some implementations, the event collector 430 extracts event data from a request and outputs the event data to the indexer 432, and the indexer generates events from the event data. In some implementations, the event collector 430 sends an acknowledgement message to the data source 402 to indicate that the event collector 430 has received a particular request form the data source 402, and/or to indicate to the data source 402 that events in the request have been added to an index.

The indexer 432 ingests incoming data and transforms the data into searchable knowledge in the form of events. In the data intake and query system, an event is a single piece of data that represents activity of the component represented in FIG. 4B by the data source 402. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 432 can include a parsing module 434 and an indexing module 436 for generating and storing the events. The parsing module 434 and indexing module 436 can be modular and pipelined, such that one component can be operating on a first set of data while the second component is simultaneously operating on a second sent of data. Additionally, the indexer 432 may at any time have multiple instances of the parsing module 434 and indexing module 436, with each set of instances configured to simultaneously operate on data from the same data source or from different data sources. The parsing module 434 and indexing module 436 are illustrated in FIG. 4B to facilitate discussion, with the understanding that implementations with other components are possible to achieve the same functionality.

The parsing module 434 determines information about incoming event data, where the information can be used to identify events within the event data. For example, the parsing module 434 can associate a source type with the event data. A source type identifies the data source 402 and describes a possible data structure of event data produced by the data source 402. For example, the source type can indicate which fields to expect in events generated at the data source 402 and the keys for the values in the fields, and possibly other information such as sizes of fields, an order of the fields, a field separator, and so on. The source type of the data source 402 can be specified when the data source 402 is configured as a source of event data. Alternatively, the parsing module 434 can determine the source type from the event data, for example from an event field in the event data or using machine learning techniques applied to the event data.

Other information that the parsing module 434 can determine includes timestamps. In some cases, an event includes a timestamp as a field, and the timestamp indicates a point in time when the action represented by the event occurred or was recorded by the data source 402 as event data. In these cases, the parsing module 434 may be able to determine from the source type associated with the event data that the timestamps can be extracted from the events themselves. In some cases, an event does not include a timestamp and the parsing module 434 determines a timestamp for the event, for example from a name associated with the event data from the data source 402 (e.g., a file name when the event data is in the form of a file) or a time associated with the event data (e.g., a file modification time). As another example, when the parsing module 434 is not able to determine a timestamp from the event data, the parsing module 434 may use the time at which it is indexing the event data. As another example, the parsing module 434 can use a user-configured rule to determine the timestamps to associate with events.

The parsing module 434 can further determine event boundaries. In some cases, a single line (e.g., a sequence of characters ending with a line termination) in event data represents one event while in other cases, a single line represents multiple events. In yet other cases, one event may span multiple lines within the event data. The parsing module 434 may be able to determine event boundaries from the source type associated with the event data, for example from a data structure indicated by the source type. In some implementations, a user can configure rules the parsing module 434 can use to identify event boundaries.

The parsing module 434 can further extract data from events and possibly also perform transformations on the events. For example, the parsing module 434 can extract a set of fields (key-value pairs) for each event, such as a host or hostname, source or source name, and/or source type. The parsing module 434 may extract certain fields by default or based on a user configuration. Alternatively or additionally, the parsing module 434 may add fields to events, such as a source type or a user-configured field. As another example of a transformation, the parsing module 434 can anonymize fields in events to mask sensitive information, such as social security numbers or account numbers. Anonymizing fields can include changing or replacing values of specific fields. The parsing component 434 can further perform user-configured transformations.

The parsing module 434 outputs the results of processing incoming event data to the indexing module 436, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 432 can be configured to identify searchable segments that are parts of fields, searchable segments that are entire fields, or both. The parsing module 434 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 446, to find event data that matches a search query. In some implementations, segmentation can alternatively be performed by the forwarder 426. Segmentation can also be disabled, in which case the indexer 432 will not build a lexicon for the event data. When segmentation is disabled, the search system searches the event data directly.

Building index data structures generates the index 438. The index 438 is a storage data structure on a storage device (e.g., a disk drive or other physical device for storing digital data). The storage device may be a component of the computing device on which the indexer 432 is operating (referred to herein as local storage) or may be a component of a different computing device (referred to herein as remote storage) that the indexer 438 has access to over a network. The indexer 432 can manage more than one index and can manage indexes of different types. For example, the indexer 432 can manage event indexes, which impose minimal structure on stored data and can accommodate any type of data. As another example, the indexer 432 can manage metrics indexes, which use a highly structured format to handle the higher volume and lower latency demands associated with metrics data.

The indexing module 436 organizes files in the index 438 in directories referred to as buckets. The files in a bucket 444 can include raw data files, index files, and possibly also other metadata files. As used herein, "raw data" means data as when the data was produced by the data source 402, without alteration to the format or content. As noted previously, the parsing component 434 may add fields to event data and/or perform transformations on fields in the event data. Event data that has been altered in this way is referred to herein as enriched data. A raw data file 448 can include enriched data, in addition to or instead of raw data. The raw data file 448 may be compressed to reduce disk usage. An index file 446, which may also be referred to herein as a "time-series index" or tsidx file, contains metadata that the indexer 432 can use to search a corresponding raw data file 448. As noted above, the metadata in the index file 446 includes a lexicon of the event data, which associates each unique keyword in the event data with a reference to the location of event data within the raw data file 448. The keyword data in the index file 446 may also be referred to as an inverted index. In various implementations, the data intake and query system can use index files for other purposes, such as to store data summarizations that can be used to accelerate searches.

A bucket 444 may include event data for a particular range of time. The indexing module 436 may arrange buckets in the index 438 according to the age of the buckets, such that buckets for more recent ranges of time are stored in short-term storage 440 and buckets for less recent ranges of time are stored in long-term storage 442. Short-term storage 440 may be faster to access while long-term storage 442 may be slower to access. Buckets may be moves from short-term storage 440 to long-term storage 442 according to a configurable data retention policy, which can indicate at what point in time a bucket is old enough to be moved.

A bucket's location in short-term storage 440 or long-term storage 442 can also be indicated by the bucket's status. As an example, a bucket's status can be "hot," "warm," "cold," "frozen," or "thawed." In this example, hot bucket is one to which the indexer 432 is writing data and the bucket becomes a warm bucket when the index 432 stops writing data to it. In this example, both hot and warm buckets reside in short-term storage 440. Continuing this example, when a warm bucket is moved to long-term storage 442, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 420 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 420 through the monitoring console 416 provided by the user interface system 414. Using the monitoring console 416, the user can configure and monitor an index cluster, and see information such as disk usage by an index, volume usage by an indexer, index and volume size over time, data age, statistics for bucket types, and bucket settings, among other information.

Figure 4C:
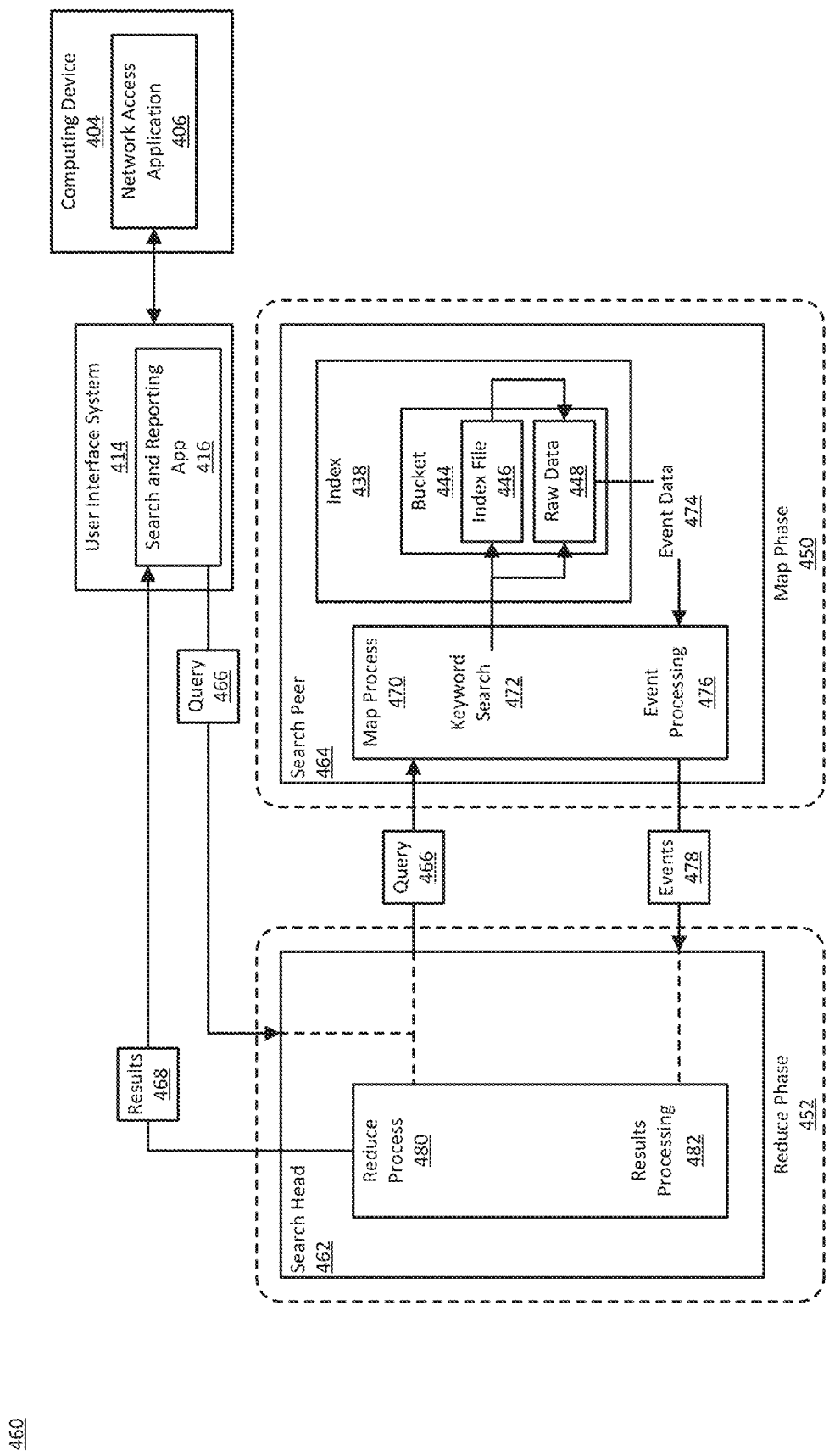
FIG. 4C is a block diagram illustrating an example of the search system.

FIG. 4C is a block diagram illustrating in greater detail an example of the search system 460 of a data intake and query system, such as the data intake and query system 410 of FIG. 4. The search system 460 of FIG. 4C issues a query 466 to a search head 462, which sends the query 466 to a search peer 464. Using a map process 470, the search peer 464 searches the appropriate index 438 for events identified by the query 466 and sends events 478 so identified back to the search head 462. Using a reduce process 482, the search head 462 processes the events 478 and produces results 468 to respond to the query 466. The results 468 can provide useful insights about the data stored in the index 438. These insights can aid in the administration of information technology systems, in security analysis of information technology systems, and/or in analysis of the development environment provided by information technology systems.

The query 466 that initiates a search is produced by a search and reporting app 416 that is available through the user interface system 414 of the data intake and query system. Using a network access application 406 executing on a computing device 404, a user can input the query 466 into a search field provided by the search and reporting app 416. Alternatively or additionally, the search and reporting app 416 can include pre-configured queries or stored queries that can be activated by the user. In some cases, the search and reporting app 416 initiates the query 466 when the user enters the query 466. In these cases, the query 466 maybe referred to as an "ad-hoc" query. In some cases, the search and reporting app 416 initiates the query 466 based on a schedule. For example, the search and reporting app 416 can be configured to execute the query 466 once per hour, once per day, at a specific time, on a specific date, or at some other time that can be specified by a date, time, and/or frequency. These types of queries maybe referred to as scheduled queries.

The query 466 is specified using a search processing language. The search processing language includes commands or search terms that the search peer 464 will use to identify events to return in the search results 468. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 466 to include sequential commands, where a subsequent command may operate on the results of a prior command. As an example, sequential commands may be separated in the query 466 by a vertical line ("|" or "pipe") symbol.

In addition to one or more search commands, the query 466 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 466 occurs in two broad phases: a map phase 450 and a reduce phase 452. The map phase 450 takes place across one or more search peers. In the map phase 450, the search peers locate event data that matches the search terms in the search query 466 and sorts the event data into field-value pairs. When the map phase 450 is complete, the search peers send events that they have found to one or more search heads for the reduce phase 452. During the reduce phase 452, the search heads process the events through commands in the search query 466 and aggregate the events to produce the final search results 468.

A search head, such as the search head 462 illustrated in FIG. 4C, is a component of the search system 460 that manages searches. The search head 462, which may also be referred to herein as a search management component, can be implemented using program code that can be executed on a computing device. The program code for the search head 462 can be stored on a non-transitory computer-readable medium and from this medium can be loaded or copied to the memory of a computing device. One or more hardware processors of the computing device can read the program code from the memory and execute the program code in order to implement the operations of the search head 462.

Upon receiving the search query 466, the search head 462 directs the query 466 to one or more search peers, such as the search peer 464 illustrated in FIG. 4C. "Search peer" is an alternate name for "indexer" and a search peer may be largely similar to the indexer described previously. The search peer 464 may be referred to as a "peer node" when the search peer 464 is part of an indexer cluster. The search peer 464, which may also be referred to as a search execution component, can be implemented using program code that can be executed on a computing device. In some implementations, one set of program code implements both the search head 462 and the search peer 464 such that the search head 462 and the search peer 464 form one component. In some implementations, the search head 462 is an independent piece of code that performs searching and no indexing functionality. In these implementations, the search head 462 may be referred to as a dedicated search head.

The search head 462 may consider multiple criteria when determining whether to send the query 466 to the particular search peer 464. For example, the search system 460 may be configured to include multiple search peers that each have duplicative copies of at least some of the event data and are implanted using different hardware resources q. In this example, the sending the search query 466 to more than one search peer allows the search system 460 to distribute the search workload across different hardware resources. As another example, search system 460 may include different search peers for different purposes (e.g., one has an index storing a first type of data or from a first data source while a second has an index storing a second type of data or from a second data source). In this example, the search query 466 may specify which indexes to search, and the search head 462 will send the query 466 to the search peers that have those indexes.

To identify events 478 to send back to the search head 462, the search peer 464 performs a map process 470 to obtain event data 474 from the index 438 that is maintained by the search peer 464. During a first phase of the map process 470, the search peer 464 identifies buckets that have events that are described by the time indicator in the search query 466. As noted above, a bucket contains events whose timestamps fall within a particular range of time. For each bucket 444 whose events can be described by the time indicator, during a second phase of the map process 470, the search peer 464 performs a keyword search 474 using search terms specified in the search query 466. The search terms can be one or more of keywords, phrases, fields, Boolean expressions, and/or comparison expressions that in combination describe events being searched for. When segmentation is enabled at index time, the search peer 464 performs the keyword search 472 on the bucket's index file 446. As noted previously, the index file 446 includes a lexicon of the searchable terms in the events stored in the bucket's raw data 448 file. The keyword search 472 searches the lexicon for searchable terms that correspond to one or more of the search terms in the query 466. As also noted above, the lexicon incudes, for each searchable term, a reference to each location in the raw data 448 file where the searchable term can be found. Thus, when the keyword search identifies a searchable term in the index file 446 that matches a search term in the query 466, the search peer 464 can use the location references to extract from the raw data 448 file the event data 474 for each event that include the searchable term.

In cases where segmentation was disabled at index time, the search peer 464 performs the keyword search 472 directly on the raw data 448 file. To search the raw data 448, the search peer 464 may identify searchable segments in events in a similar manner as when the data was indexed. Thus, depending on how the search peer 464 is configured, the search peer 464 may look at event fields and/or parts of event fields to determine whether an event matches the query 466. Any matching events can be added to the event data 474 read from the raw data 448 file. The search peer 464 can further be configured to enable segmentation at search time, so that searching of the index 438 causes the search peer 464 to build a lexicon in the index file 446.

The event data 474 obtained from the raw data 448 file includes the full text of each event found by the keyword search 472. During a third phase of the map process 470, the search peer 464 performs event processing 476 on the event data 474, with the steps performed being determined by the configuration of the search peer 464 and/or commands in the search query 466. For example, the search peer 464 can be configured to perform field discovery and field extraction. Field discovery is a process by which the search peer 464 identifies and extracts key-value pairs from the events in the event data 474. The search peer 464 can, for example, be configured to automatically extract the first 100 fields (or another number of fields) in the event data 474 that can be identified as key-value pairs. As another example, the search peer 464 can extract any fields explicitly mentioned in the search query 466. The search peer 464 can, alternatively or additionally, be configured with particular field extractions to perform.

Other examples of steps that can be performed during event processing 476 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 464 sends processed events 478 to the search head 462, which performs a reduce process 480. The reduce process 480 potentially receives events from multiple search peers and performs various results processing 482 steps on the received events. The results processing 482 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 482 can further include applying commands from the search query 466 to the events. The query 466 can include, for example, commands for evaluating and/or manipulating fields (e.g., to generate new fields from existing fields or parse fields that have more than one value). As another example, the query 466 can include commands for calculating statistics over the events, such as counts of the occurrences of fields, or sums, averages, ranges, and so on, of field values. As another example, the query 466 can include commands for generating statistical values for purposes of generating charts of graphs of the events.

The reduce process 480 outputs the events found by the search query 466, as well as information about the events. The search head 462 transmits the events and the information about the events as search results 468, which are received by the search and reporting app 416. The search and reporting app 416 can generate visual interfaces for viewing the search results 468. The search and reporting app 416 can, for example, output visual interfaces for the network access application 406 running on a computing device 404 to generate.

The visual interfaces can include various visualizations of the search results 468, such as tables, line or area charts, Chloropleth maps, or single values. The search and reporting app 416 can organize the visualizations into a dashboard, where the dashboard includes a panel for each visualization. A dashboard can thus include, for example, a panel listing the raw event data for the events in the search results 468, a panel listing fields extracted at index time and/or found through field discovery along with statistics for those fields, and/or a timeline chart indicating how many events occurred at specific points in time (as indicated by the timestamps associated with each event). In various implementations, the search and reporting app 416 can provide one or more default dashboards. Alternatively or additionally, the search and reporting app 416 can include functionality that enables a user to configure custom dashboards.

The search and reporting app 416 can also enable further investigation into the events in the search results 416. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 466. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

In some implementations, a data intake and query system as described above may further include a stream data processing system. The stream data processing system can illustratively be configured to operate on the basis of data streams, rather than data sets, such as by manipulating the data streams according to one or more data sets of data processing instructions, sometimes referred to as pipelines.

In one example, the data intake and query system provides a unified query language that can be applied to both conduct batch queries and implement data stream processing instruction set. In another example, the data intake and query system provides graphical user interfaces to design data stream processing instruction set, and is configured to convert graphically designated data stream processing instruction sets into textual query language representations of the data stream processing instruction sets. In some cases, the data intake and query system may be configured to programmatically implement a given query command as a batch query, a data stream processing instruction set, or a combination thereof. For example, a query specifying a time range may be execute as a batch query if the time range is prior to a present time, as a data stream processing instruction set if the time range is at or past a present time, or as a combination if the range spans both past and present (e.g., with the batch query executed from the portion of the range in the past and the data stream processing instruction set executed on the portion of the range at or past a current time).

Figure 5:
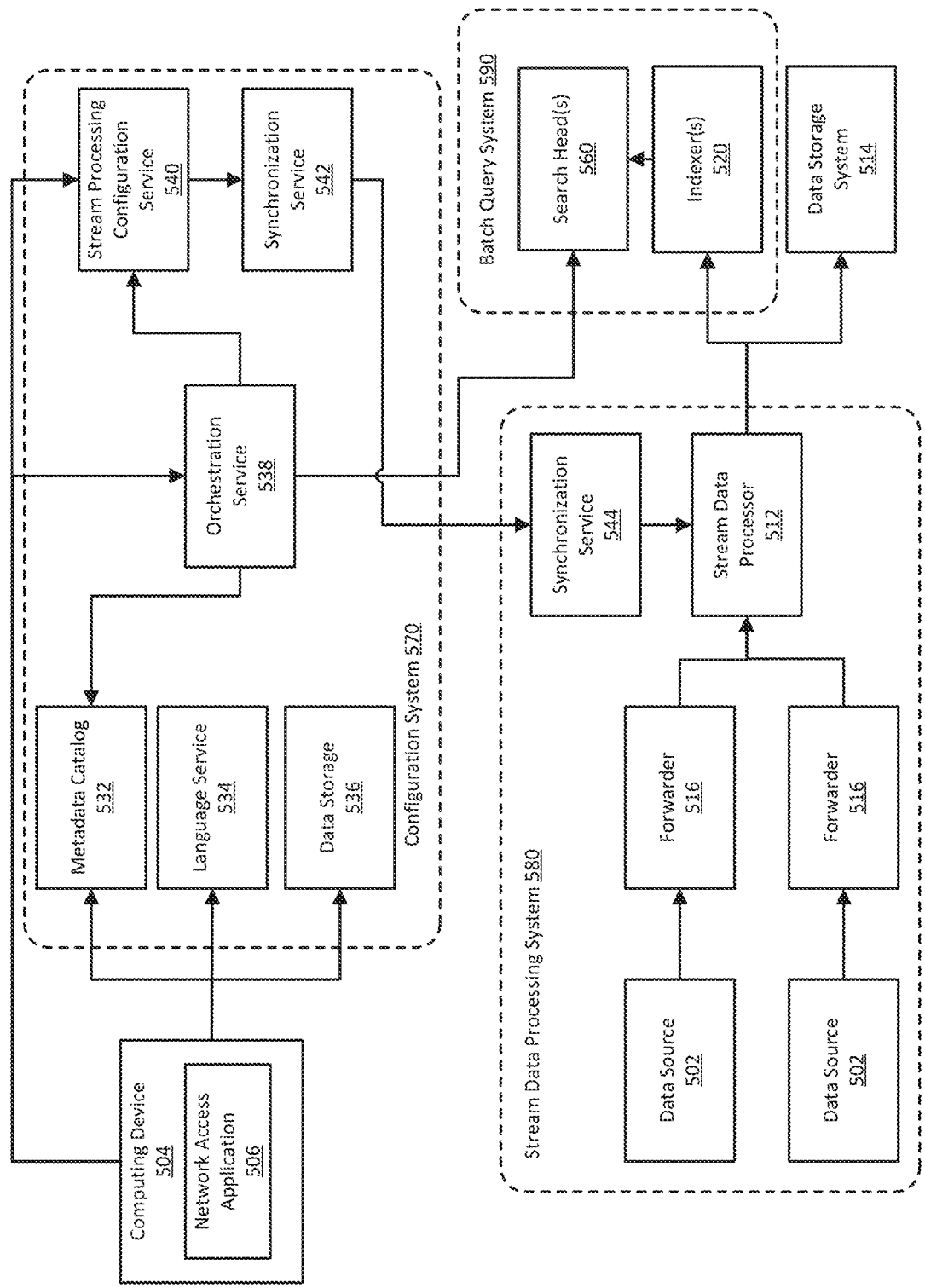
FIG. 5 illustrates an example of a self-managed network that includes a data intake and query system.

One example implementation of a data intake and query system including a stream data processing system is shown in FIG. 5. The data intake and query system of FIG. 5 includes a batch query system 590, including a search head 560 and an indexer 520. The search head 560 and indexer 520 may operate similarly to the various search heads and indexers described above, such as the search heads 960 and indexers 920 of FIG. 9.

As shown in FIG. 5, the search head 560 and indexer 520 can (in addition or alternatively to obtaining from data sources 502) obtain data from a stream data processor 512 of a stream data processing system 580. The stream data processor 512, in turn, can be configured to obtain data from data sources 502 as an input data stream, manipulate the data according to one or more data stream processing instruction set, and output the resulting data stream to indexers 520 or other network-accessible storage, such as the data storage system 514. For example, the stream data processing system 580 can include one or more forwarders 516 configured to obtain data from data sources 502 and forward the data to the stream data processor 512. In one example, the stream data processor 512 conducts filtering prior to data moving to indexers 520. Illustratively, the stream data processor 512 may identify high value data and route such data to indexers 520, while routing remaining data to the data storage system 514. In another example, the stream data processor 512 conducts other manipulations, such as re-formatting data, compressing data, or the like.

Illustratively, forwarders 516 may be configured to support a variety of protocols, transmission formats, and data formats that may be used by various data sources 502, and to forward such data to a stream data processor 512 in a format acceptable to the process 512. In some implementations, the stream data processor 512 may obtain data directly from data sources 502 and forwarders 516 may be omitted.

The data intake and query system of FIG. 5 can further include a configuration system 570 enabling user configuration of the stream data processing system 580, the batch query system 590, or both. Illustratively, a user may utilize a network access application 506, such as a web browser, executing on a computing device 504 to interact with the configuration system 570 and appropriately configure the stream data processing system 580, the batch query system 590, or both. The configuration system 570 can include a variety of elements facilitating such configuration. For example, the configuration system 570 can include data storage 536 for storage of information used by the network access application 506, such as web pages renderable on the application 506 to display interfaces facilitating configuration. The configuration system 570 can further include a language service 534 to facilitate creation of batch queries and/or pipelines implementable on the data intake and query system. For example, the language service 534 may be configured to interpret textual queries as either or both batch queries and pipelines, and generate computer executable instructions executable by the respective stream data processing system 580 and batch query system 590 to implement the textual queries. The configuration system 570 can further include a metadata catalog 532 storing information regarding the data intake and query system, such as groups (e.g., buckets) of data stored on the batch query system 590, identifiers for such groups, indexes of such groups, etc. and a configuration of the stream data processing system 580, such as data stream processing instruction sets deployed to the system 580 or metadata regarding such pipelines. Illustratively, the network access application 506 may utilize metadata stored within the metadata catalog 532 to enable a user of the computing device 504 to browse data on the data intake and query system, form queries against that data, configure or reconfigure pipelines, and the like.

The configuration system 570 shown in FIG. 5 further includes an orchestration service 538 configured to orchestrate operation of the data intake and query system. For example, the orchestration service 538 can be configured to determine whether to implement a query statement on the stream data processing system 580, the batch query system 590, or both (based, e.g., on a time range specified within the query, a source or destination specified in the query, etc.). The orchestration service 538 can further maintain the metadata catalog 532 based on results of such queries.

The configuration system 570 in FIG. 5 further includes a stream processing configuration service 540 enabling configuration of the stream data processing system 580. For example, the stream processing configuration service 540 may obtain configuration instructions from the computing device 504 and/or from the orchestration service 538 and generate a configuration for the stream data processing system 580 from such instructions. For example, the stream processing configuration service 540 may generate instructions to implement a data stream processing instruction set based on input from the computing device 504 and/or the orchestration service 538. The stream processing configuration service 540 can illustratively interact with a synchronization service 542 to provide configuration data to the stream data processing system 580. For example, the synchronization service 542 of the configuration system 570 may interact with a synchronization service 544 of the stream data processing system 580 to synchronize a configuration of the stream data process 512 with that generated at the stream processing configuration service 540.

Accordingly, by use of the configuration system 570, a user at a computing device 504 may configure and utilize either or both the stream data processing system 580 and batch query system 590.

In one embodiment, each of the configuration system 570, stream data processing system 580, and batch query system 590 is implemented within a distinct computing environment. For example, the configurations system 570 may be implemented within a multi-tenant hosted computing environment (which hosted computing environment is sometimes referred to as a "cloud computing environment"). The stream data processing system 580 may be implemented within a private computing environment, such as a private data center of an end user of the data intake and query system, which private computing environment may be referred to in some cases as an "on premises" environment. The batch query system 590 may be implemented within a single tenanted hosted computing environment, such as a cloud-hosted environment dedicated to the end user associated with the batch query system 590. Each of the elements of FIG. 5 may be in communication with one another via one or more networks, including private networks and/or public networks. Lines within FIG. 5 should be understood to depict illustrative logical interactions between elements; however, elements may interact in ways not depicted within FIG. 5.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices.

Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method, comprising:
receiving a search query;
identifying a plurality of sets of data to be processed based on the search query;
identifying a plurality of operations to be performed based on the search query;
identifying a plurality of runtime systems to execute at least a portion of the search query;
responsive to receiving the search query, configuring an inter-system interface for the plurality of runtime systems;
generating a plurality of tasks for each of the plurality of runtime systems to execute the search query, wherein a particular task of the plurality of tasks:
identifies a particular set of data of the plurality of sets of data to be processed by a particular runtime system of the plurality of runtime systems, includes instructions for the particular runtime system to retrieve at least a portion of the particular set of data from the inter-system interface, wherein the at least a portion of the particular set of data corresponds to a result of processing another set of data by another runtime system,
identifies a particular operation of the plurality of operations that the particular runtime system is to perform on the particular set of data, and
includes instructions for the particular runtime system to communicate results of performing the particular operation on the particular set of data to the inter-system interface;
distributing the plurality of tasks to the plurality of runtime systems; and
receiving, from the inter-system interface, results associated with completion of the plurality of tasks.

2. The computer-implemented method of claim 1, wherein the particular set of data includes data stored or controlled by the particular runtime system and partial search query results generated by another runtime system.

3. The computer-implemented method of claim 1, wherein identifying the plurality of operations comprises:
parsing the search query to identify query commands within the search query, and
determining the plurality of operations based on the identified query commands.

4. The computer-implemented method of claim 1, wherein identifying the plurality of runtime systems comprises:
identifying runtime systems configured to store or control access to at least a portion of at least one set of data of the plurality of sets of data, and
identifying runtime systems configured to perform at least one operation of the plurality of operations.

5. The computer-implemented method of claim 1, wherein each set of data is associated with at least one runtime system of the plurality of runtime systems.

6. The computer-implemented method of claim 1, wherein each operation is associated with at least one runtime system of the plurality of runtime systems.

7. The computer-implemented method of claim 1, wherein the inter-system interface enables communications of partial search results between the plurality of runtime systems.

8. The computer-implemented method of claim 1, wherein configuring the inter-system interface comprises instantiating a publisher subscriber model.

9. The computer-implemented method of claim 1, wherein the particular runtime system is a first runtime system, the particular task is a first task, the particular set of data is a first set of data, and the particular operation is a first operation, wherein a second task of the plurality of tasks:
identifies a second set of data of the plurality of sets of data to be processed by a second runtime system of the plurality of runtime systems, wherein the second set of data includes the results of performing the first operation on the first set of data,
identifies a second operation of the plurality of operations that the second runtime system is to perform on the second set of data, and
includes instructions for the second runtime system to retrieve the results of performing the first operation on the first set of data from the inter-system interface, process the results of performing the first operation on the first set of data according to the second operation, and communicate results of performing the second operation on the second set of data to the inter-system interface.

10. The computer-implemented method of claim 1, wherein particular runtime system is a first runtime system, the particular task is a first task, the particular set of data is a first set of data, and the particular operation is a first operation, wherein a second task of the plurality of tasks:
identifies a second set of data of the plurality of sets of data to be processed by a second runtime system of the plurality of runtime systems, wherein the second set of data includes the results of performing the first operation on the first set of data and data stored or controlled by the second runtime system,
identifies a second operation of the plurality of operations that the second runtime system is to perform on the second set of data, and
includes instructions for the second runtime system to retrieve the results of performing the first operation on the first set of data from the inter-system interface, process the results of performing the first operation on the first set of data and the data stored or controlled by the second runtime system according to the second operation, and communicate results of performing the second operation on the second set of data to the inter-system interface.

11. A system, comprising:
a data store; and
one or more processors configured to:
receive a search query;
identify a plurality of sets of data to be processed based on the search query;
identify a plurality of operations to be performed based on the search query;
identify a plurality of runtime systems to execute at least a portion of the search query;
responsive to receiving the search query, configure an inter-system interface for the plurality of runtime systems;
generate a plurality of tasks for each of the plurality of runtime systems to execute the search query, wherein a particular task of the plurality of tasks:
identify a particular set of data of the plurality of sets of data to be processed by a particular runtime system of the plurality of runtime systems,
includes instructions for the particular runtime system to retrieve at least a portion of the particular set of data from the inter-system interface, wherein the at least a portion of the particular set of data corresponds to a result of processing another set of data by another runtime system,
identify a particular operation of the plurality of operations that the particular runtime system is to perform on the particular set of data, and
include instructions for the particular runtime system to communicate results of performing the particular operation on the particular set of data to the inter-system interface;
distribute the plurality of tasks to the plurality of runtime systems; and
receive, from the inter-system interface, results associated with completion of the plurality of tasks.

12. The system of claim 11, wherein the particular set of data includes data stored or controlled by the particular runtime system and partial search query results generated by another runtime system.

13. The system of claim 11, wherein identifying the plurality of operations comprises:
    parse the search query to identify query commands within the search query, and
    determine the plurality of operations based on the identified query commands.

14. The system of claim 11, wherein identifying the plurality of runtime systems comprises:
    identify runtime systems configured to store or control access to at least a portion of at least one set of data of the plurality of sets of data, and
    identify runtime systems configured to perform at least one operation of the plurality of operations.

15. Non-transitory computer-readable media including computer-executable instructions that, when executed by a computing system, cause the computing system to:
    receive a search query;
    identify a plurality of sets of data to be processed based on the search query;
    identify a plurality of operations to be performed based on the search query;
    identify a plurality of runtime systems to execute at least a portion of the search query;
    responsive to receiving the search query, configure an inter-system interface for the plurality of runtime systems;
    generate a plurality of tasks for each of the plurality of runtime systems to execute the search query, wherein a particular task of the plurality of tasks:
        identify a particular set of data of the plurality of sets of data to be processed by a particular runtime system of the plurality of runtime systems,
        includes instructions for the particular runtime system to retrieve at least a portion of the particular set of data from the inter-system interface, wherein the at least a portion of the particular set of data corresponds to a result of processing another set of data by another runtime system,
        identify a particular operation of the plurality of operations that the particular runtime system is to perform on the particular set of data, and
        include instructions for the particular runtime system to communicate results of performing the particular operation on the particular set of data to the inter-system interface;
    distribute the plurality of tasks to the plurality of runtime systems; and
    receive, from the inter-system interface, results associated with completion of the plurality of tasks.

16. The non-transitory computer-readable media of claim 15, wherein each set of data is associated with at least one runtime system of the plurality of runtime systems.

17. The non-transitory computer-readable media of claim 15, wherein each operation is associated with at least one runtime system of the plurality of runtime systems.

18. The non-transitory computer-readable media of claim 15, wherein the inter-system interface enables communications of partial search results between the plurality of runtime systems.

19. The non-transitory computer-readable media of claim 15, wherein configuring the inter-system interface comprises instantiating a publisher subscriber model.

20. A computer-implemented method, comprising:
    receiving a search query;
    identifying a plurality of sets of data to be processed based on the search query;
    identifying a plurality of operations to be performed based on the search query;
    identifying a plurality of runtime systems to execute at least a portion of the search query;
    responsive to receiving the search query, configuring an inter-system interface for the plurality of runtime systems;
    generating plurality of tasks for each of the plurality of runtime systems to execute the search query, wherein a particular task of the plurality of tasks:
        identifies a particular set of data of the plurality of sets of data to be processed by a particular runtime system of the plurality of runtime systems,
        includes instructions for the particular runtime system to retrieve at least a portion of the particular set of data from the inter-system interface, wherein the at least a portion of the particular set of data corresponds to a result of processing another set of data by another runtime system, and
        identifies a particular operation of the plurality of operations that the particular runtime system is to perform on the particular set of data;
    distributing the plurality of tasks to the plurality of runtime systems; and
    receiving, from the inter-system interface, results associated with completion of the plurality of tasks.

* * * * *